US012307981B2

(12) United States Patent
Shehata et al.

(10) Patent No.: US 12,307,981 B2
(45) Date of Patent: May 20, 2025

(54) MICRO-OLED SUB-PIXEL UNIFORMITY COMPENSATION ARCHITECTURE FOR FOVEATED DISPLAYS

(71) Applicant: Apple Inc., Cupertino, CA (US)

(72) Inventors: Shereef Shehata, San Ramon, CA (US); Jim C Chou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,329

(22) Filed: Jun. 2, 2023

(65) Prior Publication Data

US 2024/0404479 A1 Dec. 5, 2024

(51) Int. Cl.
*G09G 3/20* (2006.01)
*G09G 3/3208* (2016.01)
*G09G 3/3291* (2016.01)

(52) U.S. Cl.
CPC ..... *G09G 3/3291* (2013.01); *G09G 2310/027* (2013.01); *G09G 2320/0233* (2013.01)

(58) Field of Classification Search
CPC ........... G09G 3/3291; G09G 2310/027; G09G 2320/0233
See application file for complete search history.

(56) References Cited

U.S. PATENT DOCUMENTS

| | | | | |
|---|---|---|---|---|
| 10,672,320 | B2 | 6/2020 | Lin et al. | |
| 11,380,255 | B2 | 7/2022 | Zhang et al. | |
| 11,403,995 | B2 | 8/2022 | Park | |
| 2008/0048951 | A1* | 2/2008 | Naugler | G09G 3/3291 345/82 |
| 2018/0075798 | A1* | 3/2018 | Nho | G09G 3/3233 |
| 2020/0033979 | A1* | 1/2020 | Sauer | G06F 3/0412 |
| 2020/0388233 | A1* | 12/2020 | Holsteen | G09G 3/3607 |
| 2021/0020098 | A1* | 1/2021 | Yum | G09G 3/3208 |
| 2022/0059002 | A1 | 2/2022 | Park et al. | |
| 2022/0165201 | A1 | 5/2022 | Park et al. | |
| 2022/0246108 | A1 | 8/2022 | Park et al. | |

* cited by examiner

*Primary Examiner* — Kwang-Su Yang
(74) *Attorney, Agent, or Firm* — Fletcher Yoder, P.C.

(57) ABSTRACT

An electronic display may include a display panel comprising a plurality of display pixels, an image source configured to store image data, and image processing circuitry. The image processing circuitry may receive a brightness level of the display panel and receive the image data that may include gray level data for a first display pixel of the plurality of display pixels. The image processing circuitry may convert the gray level data to voltage data based on the brightness level, determine a compensation for the voltage data based on a global voltage compensation value and a local voltage compensation value, and apply the compensation to the voltage data to generate compensated voltage data. The image processing circuitry may compress a range of the compensated voltage data and convert the compensated voltage data into compensated gray level data for the first display pixel.

20 Claims, 20 Drawing Sheets

MICRO-OLED SUB-PIXEL UNIFORMITY COMPENSATION ARCHITECTURE FOR FOVEATED DISPLAYS

BACKGROUND

The disclosure relates generally to electronic devices with display panels, and more particularly, to schemes for sub-pixel uniformity compensation corrections on a display panel.

Electronic displays may be found in numerous electronic devices, from mobile phones to computers, televisions, automobile dashboards, and augmented reality or virtual reality glasses, to name just a few. In certain electronic display devices, light-emitting diodes such as organic light-emitting diodes (OLEDs), micro-OLEDs (μOLEDs), or active matrix organic light-emitting diodes (AMOLEDs) may be employed as display pixels to depict a range of gray levels for display. However, due to various properties associated with the manufacturing of the display, the driving scheme of the display pixels within the display device, and other characteristics related to the display, a particular gray level output by one display pixel may be different from a gray level output by another display pixel in the same display device upon receiving the same electrical input.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to compensating for non-uniform properties of display pixels of an electronic display. For example, manufacturing tolerances for display pixels and/or displays may result in one display pixel outputting a particular gray level that may be different from a gray level output by another display pixel in the same display, even if the display pixels receive similar (or substantially similar) electrical inputs. In another example, differences in component age, operating temperatures, and material properties of the display pixels may manifest as non-uniform properties of the display pixels and/or image artifacts (e.g., visual artifacts) perceivable by a user.

Systems and methods that compensate for non-uniform properties between display pixels or groups of display pixels of the electronic display may substantially improve the visual appearance of the electronic display by reducing perceivable image artifacts. For example, image data (e.g., digital values) programmed into the display pixels may be compensated to account for the non-uniformity. A digital compensation value for a gray level to be output by the display pixel may be determined based on optical wave or electrical wave testing performed on the display, such as during manufacturing, panel calibration, or the like. In addition, the digital compensation value for the gray level may be determined based on real time color sensing circuitry, predictive modeling algorithms based on sensor data (e.g., thermal, ambient light) acquired by circuitry disposed in the display, and the like. Based on the results of the calibrating, testing, sensing, or modeling, compensation data (e.g., compensation map) may be determined for each display pixel of the electronic display.

The compensation may be determined per display pixel to leverage a relatively small number of variables to predict a brightness-to-data relationship. The brightness-to-data relationship may be referred to as a brightness-to-voltage (Lv-V) relationship, which is the case when the data signal is a voltage signal. The brightness—to data relationship may also be used when the data signal represents a current (e.g., a brightness-to-current relationship (Lv-I)) or a power (e.g., a brightness-to-power relationship (Lv-W)). It should be appreciated that further references to brightness-to-voltage (Lv-V) are intended to also apply to any suitable brightness-to-data relationship, such as a brightness-to-current relationship (Lv-I), brightness-to-power relationship (Lv-W), or the like. The predicted brightness-to-data relationship may be expressed as a curve, which may facilitate determining the appropriate data signal to transmit to the pixel to cause emission at a target brightness level of light. In addition, some examples may include a regional (e.g., local) or global adjustment to further correct non-uniformities of the electronic display. In this way, the display pixels of the electronic display may output a similar gray level when receiving the adjusted image data. As such, perceivable visual image artifacts may be reduced or eliminated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
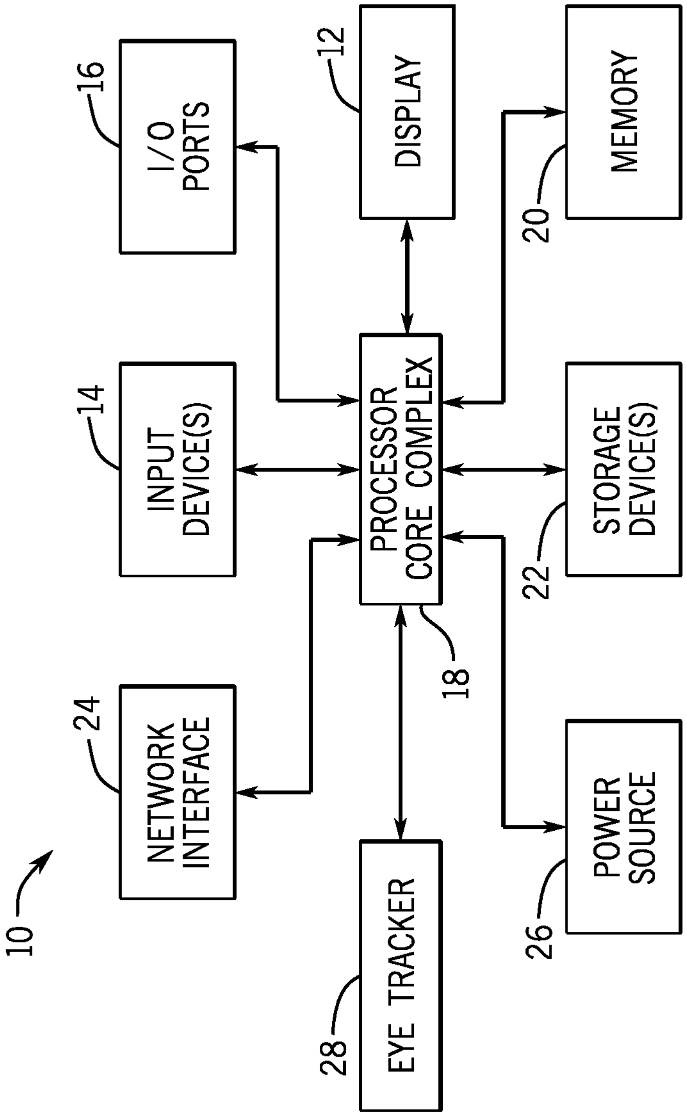
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays (e.g., micro-OLED displays) to present visual information. The electronic displays may include light-modulating pixels, which may be light-emitting in the case of light-emitting diode (LEDs), such as micro organic lit-emitting diodes (micro-OLEDs), but may selectively provide light from another light source. While this disclosure generally relates to self-emission displays, it should be appreciated that the systems and methods of this disclosure may also apply to other forms of electronic displays that have non-uniform properties of display pixels causing varying brightness versus voltage relationships (Lv-V curves), and should not be limited to self-emissive displays. To display a frame of image content, the electronic display may control a gray level (e.g., luminance) of its display pixels based on image data received at a particular resolution. For example, an image data source may provide image data as a stream of pixel data, in which data for each pixel indicates a target luminance (e.g., brightness, color) of one or more display pixels located at corresponding pixel positions. In an embodiment, image data may indicate luminance per color component, for example, via red component image data, blue component image data, and green component image data, collectively referred to as RGB image data. Additionally or alternatively, the image data may be indicated by a luma channel, a gray scale (e.g., gray level), or other color basis.

The image data may be processed to account for one or more physical or digital effects associated with displaying the image data. For example, different display pixels may emit different amounts of light even when supplied the same image data. As such, display pixel (e.g., sub-pixel) uniformity corrections may be done to compensate for the differences. In certain instances, the compensation may be applied in a voltage domain as a voltage value. To this end, the image data may be converted from a gray level domain to the voltage domain using two lookup tables, which may be dependent on brightness level of the electronic display. The voltage value may be determined based on a global compensation map, a local compensation map, or both. The compensation maps may be generated during manufacturing of the electronic display as part of a display panel calibration operation and may include data corresponding to one or more captured images. The voltage value may be applied to the image data in the voltage domain to generate compensated image data. The compensated image data may then be remapped to the gray level domain through inverse mapping voltage to digital code lookup tables, which may depend on brightness level. The compensated digital code may be programmed into the display pixels to cause display of image content on the electronic display. Because the compensated digital code may account for non-uniform properties of the display pixels, the displayed image content may be displayed with substantially reduced visual artifacts.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and an eye tracker 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

The eye tracker 28 may measure positions and movement of one or both eyes of someone viewing the electronic display 12 of the electronic device 10. For instance, the eye tracker 28 may include a sensor (e.g., a camera) that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. Accordingly, the eye tracker 28 may output viewing characteristic parameters indicative of viewing characteristics with which a user's eye is viewing or is expected to view on the electronic display 12. For example, the viewing characteristic parameters may indicate a horizontal (e.g., x-direction) offset of the eye's pupil from a default (e.g., forward facing) pupil position and a vertical (e.g., y-direction) offset of the eye's pupil from the default pupil position and, thus, may be indicative of expected viewing angle. Additionally or alternatively, the viewing characteristic parameters may indicate a pupil relief (e.g., distance from pupil to display panel) and, thus, may be indicative of expected viewing location. The processor core complex 18 may use the gaze angle(s) of the eyes of the viewer when generating image data for display on the electronic display 12.

Figure 2:
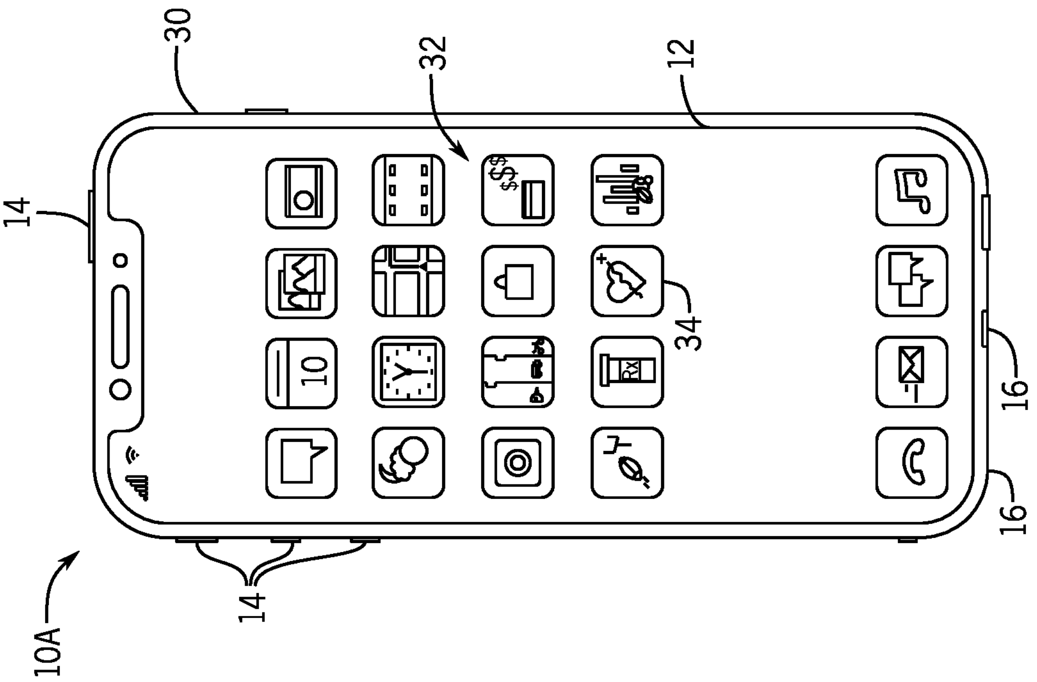
FIG. 2 is a perspective view of a watch representing an embodiment of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as an iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
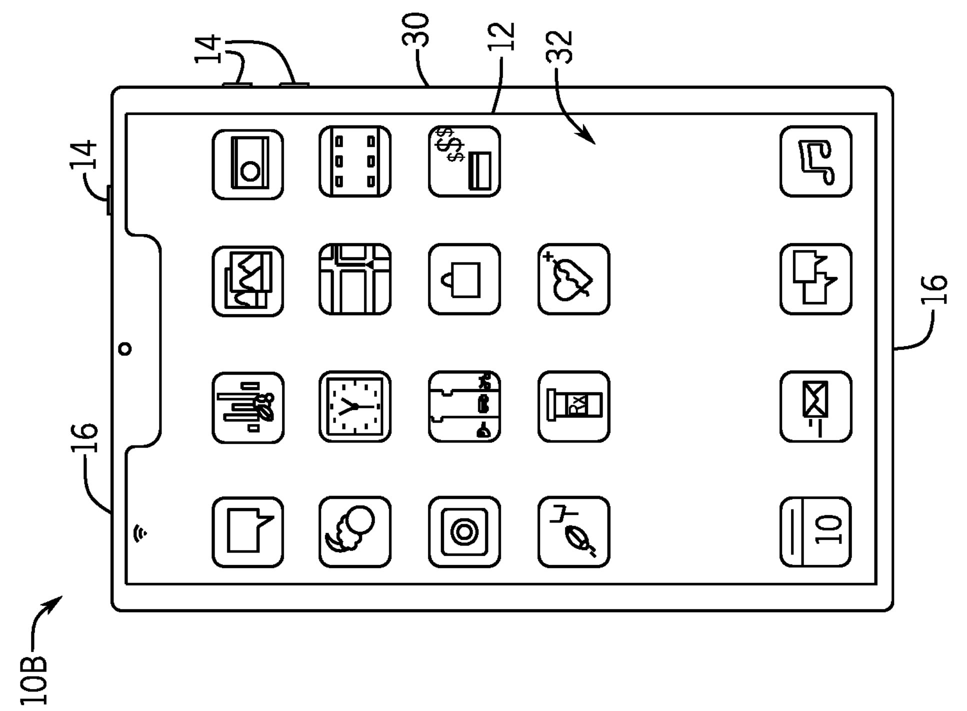
FIG. 3 is a front view of a tablet device representing an embodiment of the electronic device of FIG. 1, in accordance with an embodiment.
Figure 4:
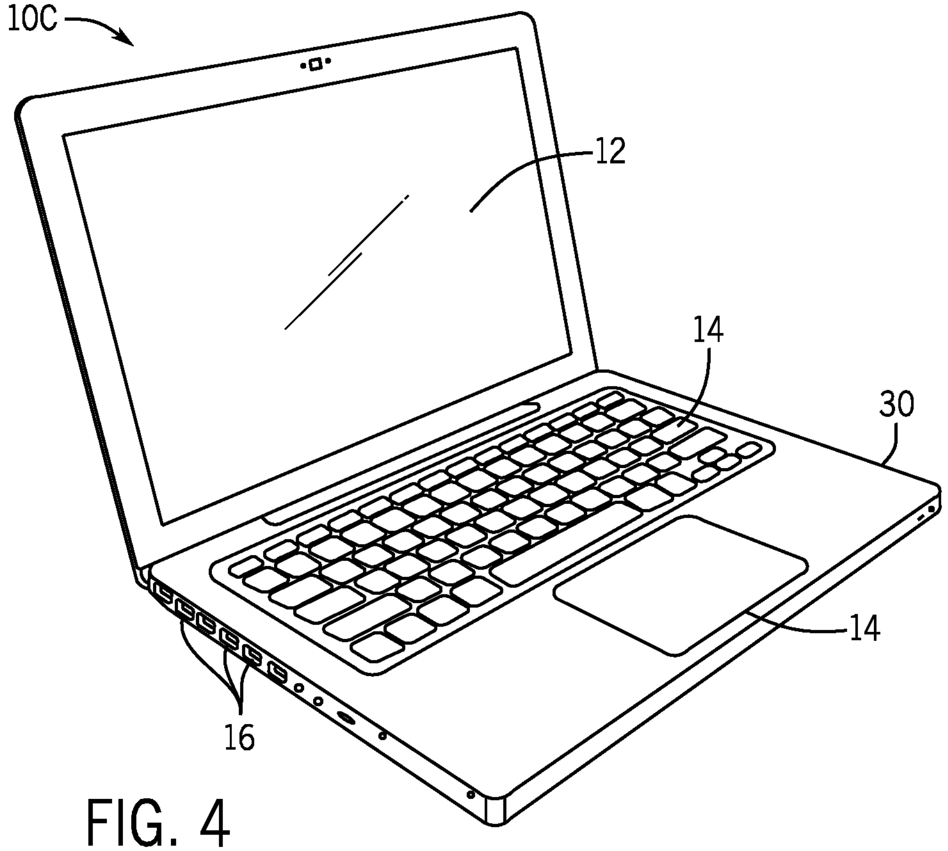
FIG. 4 is a front view of a computer representing an embodiment of the electronic device of FIG. 1, in accordance with an embodiment.
Figure 5:
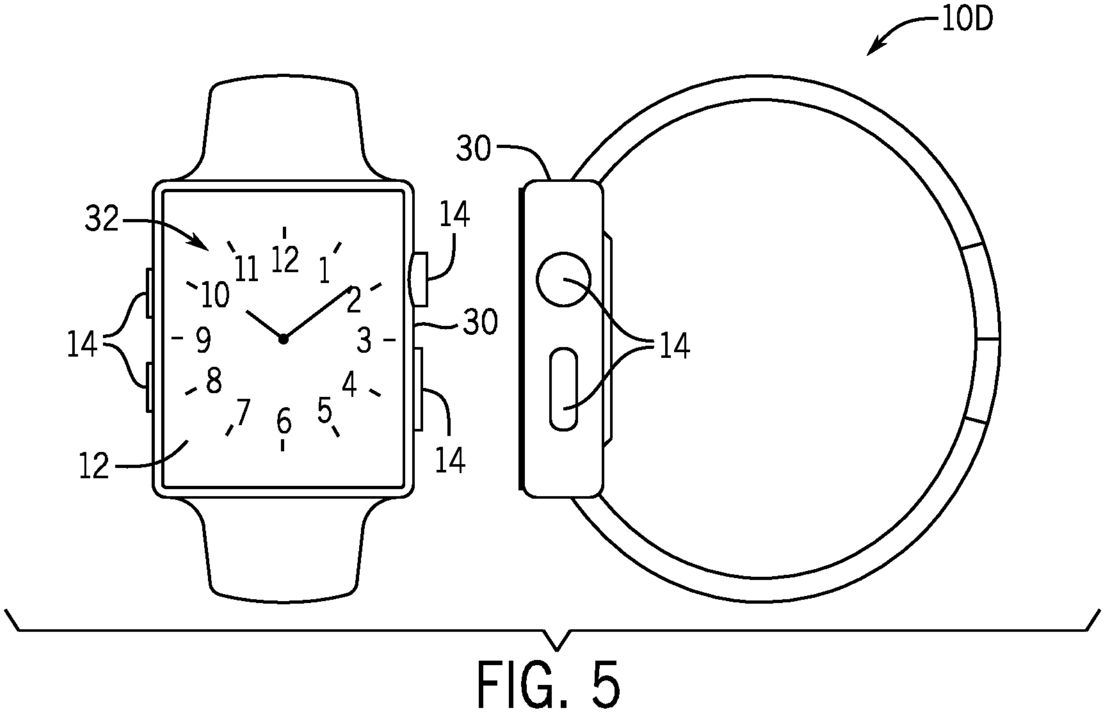
FIG. 5 is a circuit diagram of the display of the electronic device of FIG. 1, in accordance with an embodiment.

Another example of a suitable electronic device 10, specifically a tablet device 10B, is shown in FIG. 3. The tablet device 10B may be any iPAD® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
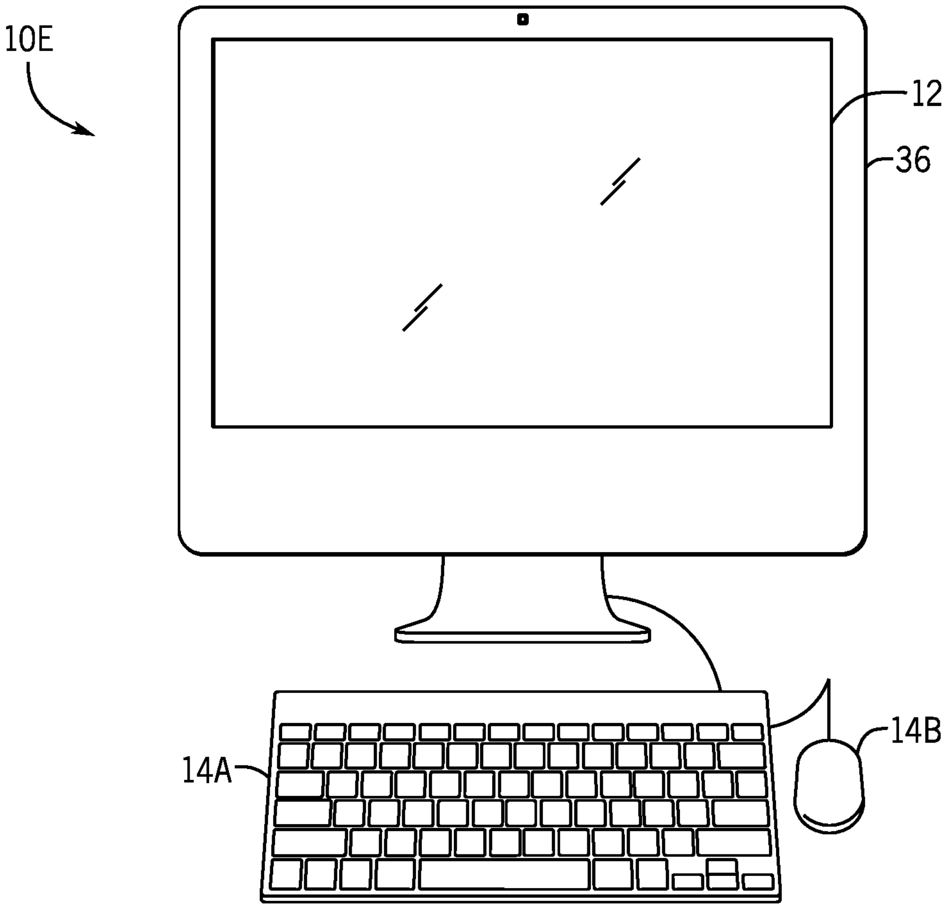
FIG. 6 is an example of the electronic device of FIG. 1 in the form of a desktop computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar devices by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input device(s) 14, such as the keyboard 14A or mouse 14B (e.g., input devices 14), which may connect to the computer 10E.

The electronic display 12 may include display pixels that emit light to form a frame of image content. The display pixels may be programmed with image data and emit an amount of light (e.g., luminance level, brightness level) according to image data with which the display pixels were programmed. However, in certain instances, the display pixels may emit light at a different level than a target level indicated in the image data. For example, display pixel non-uniformity may stem from display pixel current mismatch, issues in display pixel efficiency, imbalance in anode capacitance, imbalance in display pixel capacitance, imbalance in spline capacitance (e.g., capacitance at spline borders), manufacturing tolerances, and the like. For example, manufacturing tolerances may result in certain display pixels emitting more or less light than other display pixels even when supplied the same image data. In another example, variations in manufacturing of the display pixels may result emissions of the display pixel being relatively brighter or relatively darker than other display pixels when supplied the same image data. As discussed herein, a compensation may be applied to the image data to provide uniformity corrections during display operations.

Figure 7:
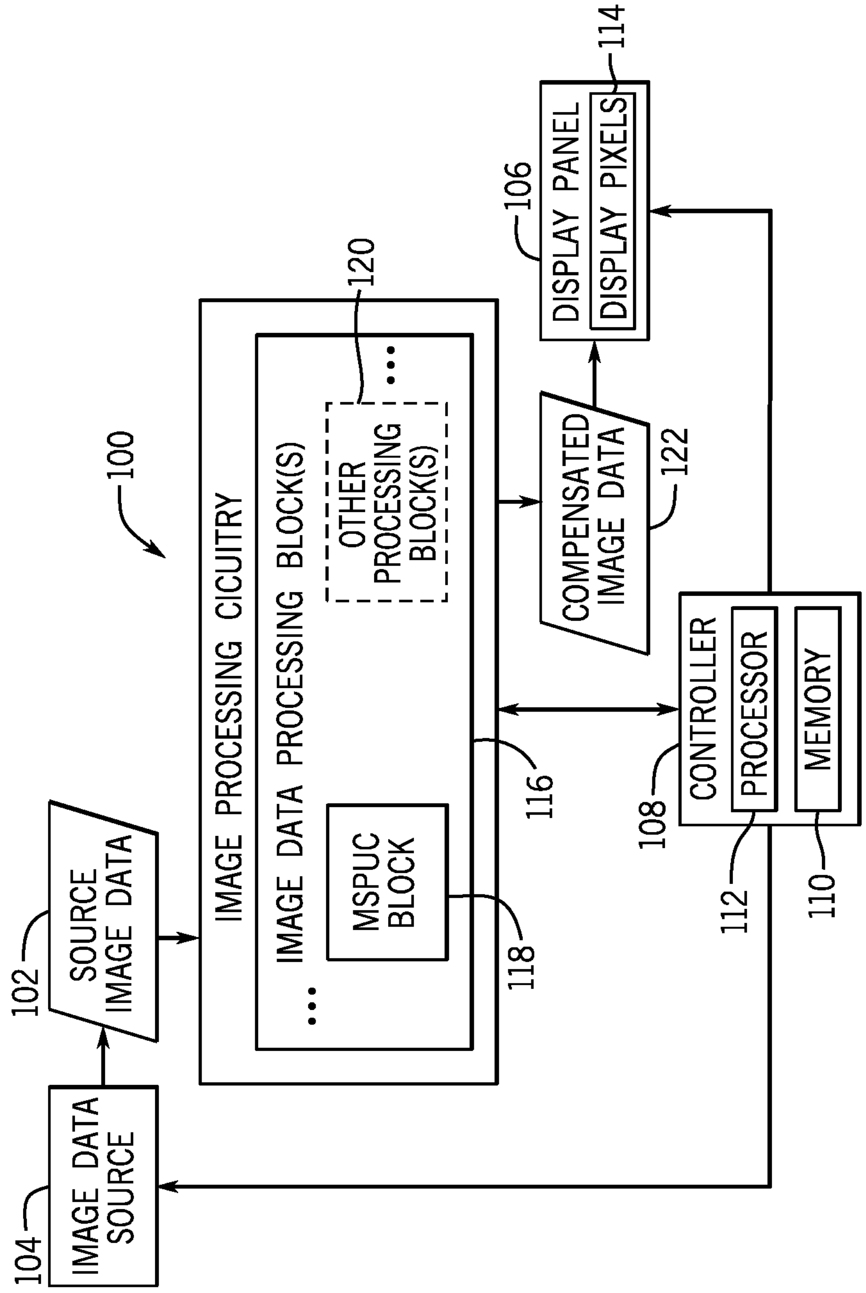
FIG. 7 is a block diagram of the electronic device of FIG. 1 including image processing circuitry that receives source image data and applies a compensation to provide uniformity corrections, in accordance with an embodiment.

With the foregoing in mind, FIG. 7 is a block diagram of the electronic device 10 including image processing circuitry 100 that may receive source image data 102 and apply a compensation to the source image data 102 to provide uniformity corrections. The image processing circuitry 100 may be implemented in the electronic device 10, in the micro-OLED display 12, or a combination thereof. For example, the image processing circuitry 100 may be included in the processor core complex 18, image processing circuitry, and the like. As should be appreciated, although image processing is discussed herein as being performed via a number of image data processing blocks, embodiments may include general purpose and/or dedicated hardware or software components to carry out the techniques discussed herein.

The electronic device 10 may include an image data source 104, a display panel 106, and/or a controller 108 in communication with the image processing circuitry 100. In some embodiments, the display panel 106 of the micro-OLED display 12 may include a reflective technology display, a liquid crystal display (LCD), or any other suitable type of display panel 106. In some embodiments, the controller 108 may control operation of the image processing circuitry 100, the electronic display 12, the one or more eye trackers 28, the image data source 104, or any combination thereof. Although depicted as a single controller 108, in other embodiments, one or more separate controllers 108 may be used to control operation of the image data source 104, the image processing circuitry 100, the electronic display 12, the one or more eye trackers 28, or any combination thereof.

To control operation, the controller 108 may include one or more controller processors and/or controller memory 110. In some embodiments, the controller processor 112 may be included in the processor core complex 18, the image processing circuitry 100, a timing controller (TCON) in the electronic display 12, a separate processing module, or any combination thereof and execute instructions stored in the controller memory 110.

Generally, the image data source 104 may be implemented and/or operated to generate source (e.g., input or original) image data 102 corresponding with image content to be displayed on the display panel 106 of the electronic display 12. Thus, in some embodiments, the image data source 104 may be included in the processor core complex 18, a graphics processing unit (GPU), an image sensor (e.g., camera), and/or the like. Additionally, in some embodiments, the source image data 102 may be stored in the electronic device 10 before supply to the image processing circuitry 100, for example, in memory 20, a storage device 22, and/or a separate, tangible, non-transitory computer-readable medium. In fact, as well be described in more detail below, to conserve (e.g., optimizing) storage capacity of the electronic device 10, in some embodiments, the source image data 102 may be stored and/or supplied to the image processing circuitry 100 in a foveated (e.g., compressed or grouped) domain, which utilizes a pixel resolution different from (e.g., lower than) a panel (e.g., native or non-foveated) domain of the display panel 106.

As illustrated in FIG. 7, the display panel 106 of the electronic display 12 may include one or more display pixels 114, which each include one or more color component sub-pixels. For example, each display pixel 114 implemented on the display panel 106 may include a red sub-pixel, a blue sub-pixel, and a green sub-pixel. In some embodiments, one or more display pixels 114 on the display panel 106 may additionally or alternatively include a white sub-pixel.

The electronic display 12 may display image content on its display panel 106 by appropriately controlling light emission from display pixels (e.g., color component sub-pixels) 114 implemented thereon. Generally, light emission from a display pixel (e.g., color component sub-pixel) 114 may vary with the magnitude of electrical energy stored therein. For example, in some instances, a display pixel 114 may include a light-emissive element, such as an organic light-emitting diode (OLED), that varies its light emission with current flow therethrough, a current control switching device (e.g., transistor) coupled between the light-emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light-emissive element of the display pixel 114.

However, it should be appreciated that discussion with regard to OLED examples are intended to be illustrative and not limiting. In other words, the techniques described in the present disclosure may be applied to and/or adapted for other types of electronic displays 12, such as a liquid crystal display (LCD) 12 and/or a micro light-emitting diode (LED) electronic displays 12. In any case, since light emission from a display pixel 114 generally varies with electrical energy storage therein, to display an image, an electronic display 12 may write a display pixel 114 at least in part by supplying an analog electrical (e.g., voltage and/or current) signal to the display pixel 114, for example, to charge and/or discharge a storage capacitor in the display pixel 114.

To selectively write its display pixels 114, as in the depicted example, the electronic display 12 may include driver circuitry, which includes a scan driver and a data driver. In particular, the electronic display 12 may be implemented such that each of its display pixels 114 is coupled to the scan driver via a corresponding scan line and to the data driver via a corresponding data line. Thus, to write a row of display pixels 114, the scan driver may output an activation (e.g., logic high) control signal to a corresponding scan line that causes each display pixel 114 coupled to the scan line to electrically couple its storage capacitor to a corresponding data line. Additionally, the data driver may output an analog electrical signal to each data line coupled to an activated display pixel 114 to control the amount of electrical energy stored in the display pixel 114 and, thus, control the resulting light emission (e.g., perceived luminance and/or perceived brightness).

As described above, image data corresponding with image content be indicative of target visual characteristics (e.g., luminance and/or color) at one or more specific points (e.g., image pixels) in the image content, for example, by indicating color component brightness (e.g., grayscale) levels that are scaled by a panel brightness setting. In other words, the image data may correspond with a pixel position on a display panel and, thus, indicate target luminance of at least a display pixel 114 implemented at the pixel position. For example, the image data may include red component image data indicative of target luminance of a red sub-pixel in the display pixel 114, blue component image data indicative of target luminance of a blue sub-pixel in the display pixel 114, green component image data indicative of target luminance of a green sub-pixel in the display pixel 114, white component image data indicative of target luminance of a white sub-pixel in the display pixel 114, or any combination thereof. As such, to display image content, the electronic display 12 may control supply (e.g., magnitude and/or duration) of electrical signals from its data driver to its display pixels 114 based at least in part on corresponding image data.

To improve perceived image quality, image processing circuitry 100 may be implemented and/or operated to process (e.g., adjust) image data before the image data is used to display a corresponding image on the electronic display 12. Thus, in some embodiments, the image processing circuitry 100 may be included in the processor core complex 18, a display pipeline (e.g., chip or integrated circuit device), a timing controller (TCON) in the electronic display 12, or any combination thereof. Additionally or alternatively, the image processing circuitry 100 may be implemented as a system-on-chip (SoC).

As in the depicted example, the image processing circuitry 100 may receive source image data 102 corresponding to a desired image (e.g., a frame of image content) to be displayed on the micro-OLED display 12 from the image data source 104. The source image data 102 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 102 may reside in a linear color space, a gamma-corrected color space, a gray level space, or any other suitable color space. As used herein, pixels or pixel data may refer to a grouping of sub-pixels (e.g., individual color component pixels such as red, green, and blue) or the sub-pixels themselves.

As described herein, the image processing circuitry 100 may operate to process the source image data 102 received from the image data source 104. The image data source 104 may include captured images from cameras, images stored in memory, graphics generated by the processor core complex 18, or a combination thereof. Additionally, the image processing circuitry 100 may include one or more sets of image data processing blocks 116 (e.g., circuitry, modules, or processing stages), such as a micro-OLED sub-pixel uniformity correction (MSPUC) block 118. As should be appreciated, multiple other processing blocks 120 may also be incorporated into the image processing circuitry 100, such as a color management block, a dither block, a pixel contrast control (PCC) block, a burn-in compensation (BIC) block, a scaling/rotation block, a panel response correction (PRC) block, and the like, before and/or after the MSPUC block 118. The image data processing blocks 120 may receive and process the source image data 102 and output compensated image data 122 in a format (e.g., digital format and/or resolution) interpretable by the display panel 106. Further, the functions (e.g., operations) performed by the image processing circuitry 100 may be divided between various image data processing blocks 116, and, while the term "block" is used herein, there may or may not be a logical or physical separation between the image data processing blocks 116.

To compensate for sub-pixel non-uniformity, the MSPUC block 118 may determine and apply a compensation (e.g., voltage offset) to the source image data 102 to generate the compensated image data 122 for the display panel 106. For example, the MSPUC block 118 apply a voltage value to the source image data 102 to generate the compensated image data 122. The MSPUC block 118 may convert the source image data 102 from a gray level domain to a voltage domain. The MSPUC block 118 may determine the voltage value from a global compensation map and/or a local compensation map that may be generated during manufacturing as part of a panel calibration operation. To generate the compensation maps, image capturing devices may capture an image of the display panel 106 at a particular brightness level or at a particular current level. As will be appreciated, generating several compensation maps at varying brightness levels during calibration and selecting which map to reference to obtain relevant voltage offsets may improve compensation operations. For example, a particular map may be selected from a group of maps based on real-time operating conditions of the display panel 106 (e.g., input brightness value, input current levels, temperature levels), and be used to derive display pixel functions associated with the condition. As such, the MSPUC block 118 may determine the voltage value based on the operating conditions and generate the compensated image data 122. The compensated image data 122 may be converted from the voltage domain to the gray level domain and transmitted to the display panel 106 for programming the display pixels 114. In this way, the MSPUC block 118 may provide for display pixel 114 uniformity corrections, which may make the display panel 106 appear relatively more uniform and/or improve an appearance of the display panel 106.

Certain electronic displays, known as "foveated" displays, display images at higher resolution where a viewer is looking and at lower resolution in the peripheral vision of the viewer. The image data for foveated displays thus may have some pixels that are grouped (e.g., foveation regions) together to display the same image data. In particular, in the foveated domain, an image frame may be divided in multiple foveation regions (e.g., tiles) in which different pixel resolutions are utilized.

Figure 8:
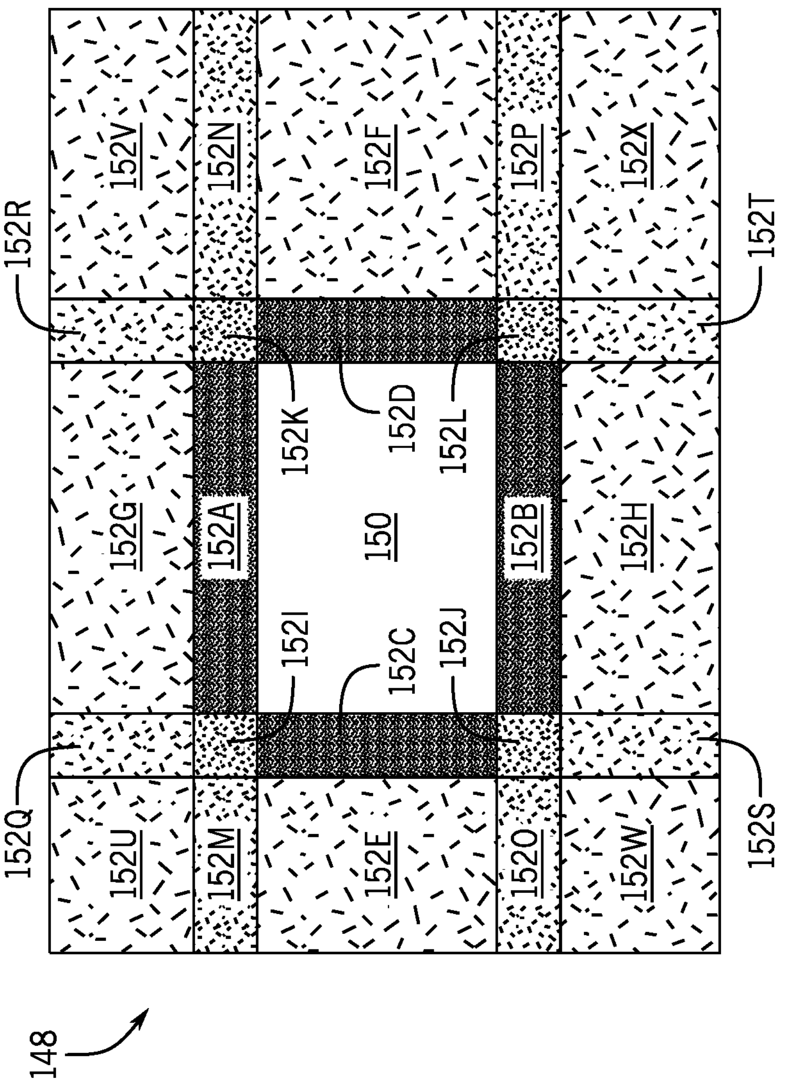
FIG. 8 is a block diagram of an example portion of the electronic device of FIG. 1 including an electronic display illustrating foveated regions, in accordance with an embodiment.

To help illustrate, an example of an image frame 148 divided into multiple foveation regions is shown in FIG. 8. As depicted, a central foveation region 150 is identified in the image frame 148, which is displayed on the electronic display 12 (e.g., electronic panel). Additionally, as depicted, multiple outer foveation regions 152 outside of the central foveation region 150 are identified in the image frame 148.

In some embodiments, the central foveation region 150 and one or more outer foveation regions 152 may be identified based at least in part on a field of view (FOV) with which the display panel 106 is expected to be viewed and, thus, based at least in part on viewing characteristics (e.g., viewing angle and/or viewing location) with which the display panel 106 is expected to be viewed. For example, the viewing characteristics may be indicated by one or more viewing characteristic parameters received from the eye tracker 28. In particular, in such embodiments, the central foveation region 150 may be identified in the image frame 148 such that the central foveation region 150 is co-located with a focus region of the field of view (FOV). In addition, an outer foveation region 152 is identified in the image frame 148 such that the outer foveation region 152 is co-located with a periphery region of the field of view. In other words, the depicted example may be identified when the focus region of the field of view is expected to be centered on a central portion of the display panel 106.

In some embodiments, a change in viewing characteristics may change the field of view and, thus, characteristics (e.g., size, location, and/or pixel resolution) of foveation regions identified in the image frame 148. For example, a change in viewing angle may move the focus region on the display panel 106, which may result in the central foveation region 150 being shifted relative to the center of the image frame 148. Additionally or alternatively, a change in viewing location that increases size of the focus region may result in size of central foveation region 150 being expanded (e.g., increased), while a change in viewing location that decreases size of the focus region may result in size of central foveation region 150 being contracted (e.g., decreased or reduced).

To improve perceived image quality, in some embodiments, the pixel resolution used in the central foveation region 150 may maximize pixel resolution implemented on the display panel 106. In other words, in some embodiments, the central foveation region 150 may utilize a pixel resolution that matches the (e.g., full) pixel resolution of display panel 106. That is, in such embodiments, each image pixel (e.g., image data corresponding with point in image) in the central foveation region 150 of the image frame 148 may correspond with single display pixel (e.g., set of one or more color component sub-pixels) 114 implemented on the display panel 106. In some embodiments, each outer foveation region 152 in the image frame 148 may utilize a pixel resolution lower than the pixel resolution of the central foveation region 150 and, thus, the (e.g., full) pixel resolution of the display panel 106. In other words, in such embodiments, each image pixel (e.g., image data corresponding with point in image) in an outer foveation region 152 of the image frame 148 may correspond with multiple display pixels implemented on the display panel 106.

To account for variation in sensitivity to visible light outside the focus region, in some embodiments, different outer foveation regions 152 identified in the image frame 148 may utilize different pixel resolutions. In particular, in such embodiments, an outer foveation region 152 closer to the central foveation region 150 may utilize a higher pixel resolution. On the other hand, in such embodiments, an outer foveation region 152 farther from the central foveation region 150 may utilize a lower pixel resolution.

Merely as an illustrative example, a first set of outer foveation regions 152 may include each outer foveation region 152 directly adjacent and outside the central foveation region 150. In other words, with regard to the depicted example, the first set of outer foveation regions 152 may include a first outer foveation region 152A, a second outer foveation region 152B, a third outer foveation region 152C, and a fourth outer foveation region 152D. Due to proximity to the central foveation region 150, in some embodiments, each outer foveation region 152 in the first set of outer foveation regions 152 may utilize a pixel resolution that is half the pixel resolution of the central foveation region 150 and, thus, the (e.g., full) pixel resolution of the display panel 106. In other words, in such embodiments, each image pixel (e.g., image data corresponding with point in image) in the first set of outer foveation regions 152 may correspond with two display pixels (e.g., sets of one or more color component sub-pixels) 114 implemented on the display panel 38.

Additionally, merely as an illustrative example, a second set of outer foveation regions 152 may include each outer foveation region 152 directly adjacent and outside the first set of outer foveation regions 152. In other words, with regard to the depicted example, the second set of outer foveation regions 152 may include a fifth outer foveation region 152E, a sixth outer foveation region 152F, a seventh outer foveation region 152G, an eighth outer foveation region 152H, a ninth outer foveation region 152I, a tenth outer foveation region 152J, an eleventh outer foveation region 152K, and a twelfth outer foveation region 152L. Due to being located outside of the first set of outer foveation regions 152, in some embodiments, each outer foveation region 152 in the second set of outer foveation regions 152 may utilize a pixel resolution that is half the pixel resolution of the first set of outer foveation regions 152 and, thus, a quarter of the pixel resolution of the central foveation region 150 and the display panel 38. In other words, in such embodiments, each image pixel (e.g., image data corresponding with point in image) in the second set of outer foveation regions 152 may correspond with four display pixels (e.g., sets of one or more color component sub-pixels) 114 implemented on the display panel 106.

Furthermore, merely as an illustrative example, a third set of outer foveation regions 152 may include each outer foveation region 152 directly adjacent and outside the second set of outer foveation regions 152. In other words, with regard to the depicted example, the third set of outer foveation regions 152 may include a thirteenth outer foveation region 152M, a fourteenth outer foveation region 152N, a fifteenth outer foveation region 152O, a sixteenth outer foveation region 152P, a seventeenth outer foveation region 152Q, an eighteenth outer foveation region 152R, a nineteenth outer foveation region 152S, and a twentieth outer foveation region 152T. Due to being located outside of the second set of outer foveation regions 152, in some embodiments, each outer foveation region 152 in the third set of outer foveation regions 152 may utilize a pixel resolution that is half the second set of outer foveation regions 152 and, thus, an eighth of the pixel resolution of the central foveation region 150 and the display panel 106. In other words, in such embodiments, each image pixel (e.g., image data corresponding with point in image) in the third set of outer foveation regions 152 may correspond with eight display pixels (e.g., sets of one or more color component sub-pixels) 114 implemented on the display panel 106.

Moreover, merely as an illustrative example, a fourth set of outer foveation regions 152 may include each outer foveation region 152 directly adjacent and outside the third set of outer foveation regions 152. In other words, with regard to the depicted example, the second set of outer foveation regions 152 may include a twenty-first outer foveation region 152U, a twenty-second outer foveation region 152V, a twenty-third outer foveation region 152W, and a twenty-fourth outer foveation region 152X. Due to being located outside of the third set of outer foveation regions 152, in some embodiments, each outer foveation region 152 in the fourth set of outer foveation regions 152 may utilize a pixel resolution that is half the pixel resolution of the third set of outer foveation regions 152 and, thus, a sixteenth of the pixel resolution of the central foveation region 150 and the display panel 106. In other words, in such embodiments, each image pixel (e.g., image data corresponding with point in image) in the fourth set of outer foveation regions 152 may correspond with sixteen display pixels (e.g., sets of one or more color component sub-pixels) implemented on the display panel 106.

Figure 9:
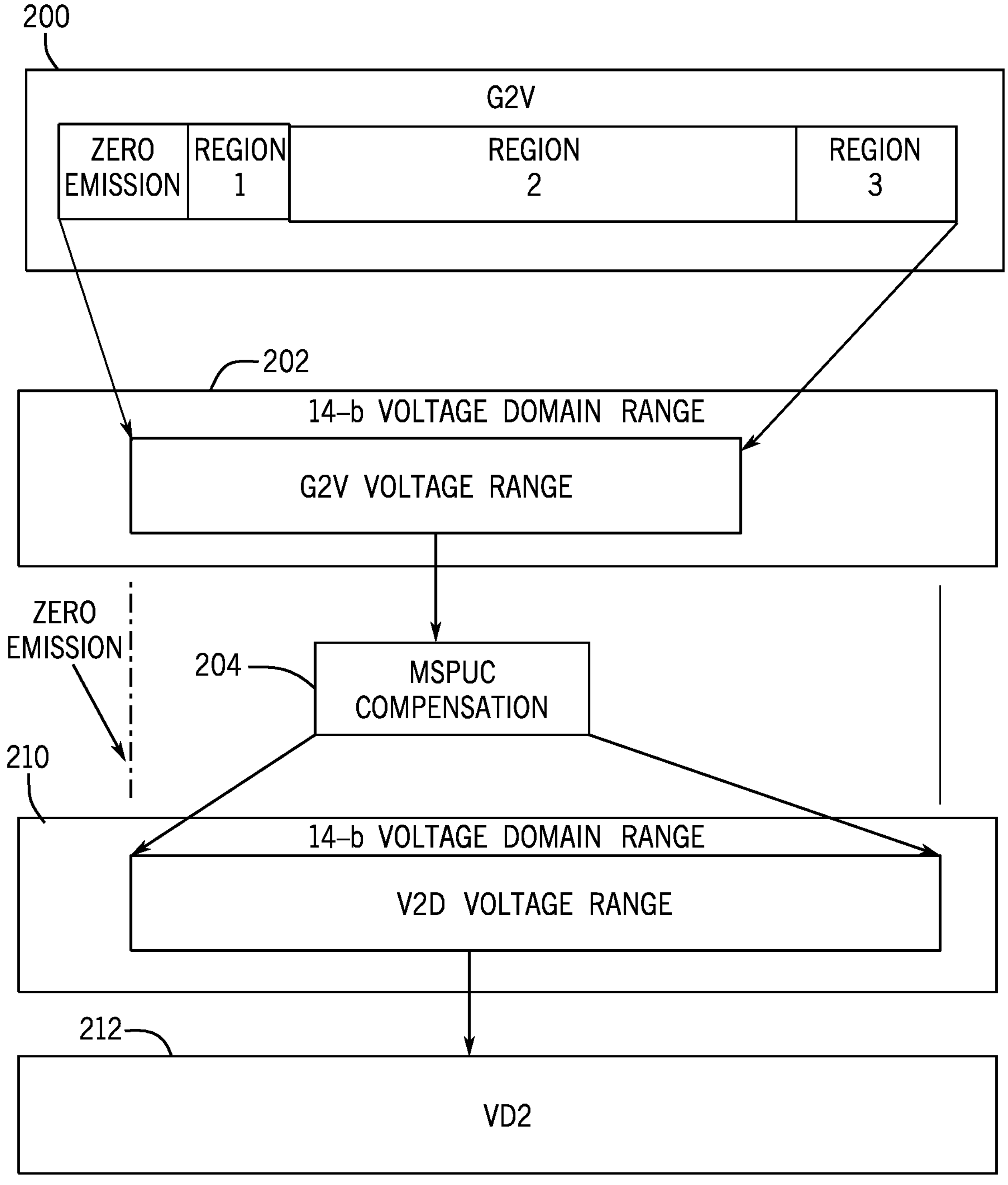
FIG. 9 is a block diagram schematically illustrating operations of the image processing circuitry of FIG. 7, in accordance with an embodiment.

With the foregoing in mind, FIG. 9 is a schematic diagram illustrating operations of the MSPUC block 118, such as converting the source image data 102 from the gray level domain to the voltage domain and generating a compensation for the source image data 102. At block 200, the MSPUC block 118 may convert the source image data 102 from the gray level domain to the voltage domain, at block 200. For example, the MSPUC block 118 may use two lookup tables (LUTs) to determine voltage equivalents of the source image data 102. The LUTs may be gray-to-voltage (G2V) LUTs that include four regions to support interpolation between entries of the LUT to improve G2V conversion efficiency. To this end, the MSPUC block 118 may determine if the source image data 102 may be within a zero emission region, a first region, a second region, or a third region to determine the voltage equivalent. The zero emission range may include one or more voltage values that correspond to no emission by the display pixel 114, such as when the display pixel 114 may be programmed with gray level 0. If the source image data 102 is within the zero emission range, then the MSPUC block 118 may skip the steps of generating and applying the compensation and convert the source image data 102 back to the gray level domain for programming into the display pixels 114. If the source image data 102 is not within the zero emission range, then the MSPUC block 118 may determine a voltage equivalent for the source image data 132 based on the first region, the second region, and/or the third region. As illustrated by block 202, the MSPUC block 118 may use a 14-bit gray level range and convert to a 14-bit voltage domain range. Although the illustrated example includes a 14-bit gray level range and a 14-bit voltage domain range, any suitable number of bits may be used by the MSPUC block 118 for conversion operations. For example, the display panel 106 may be an 8-bit panel. As such, the MSPUC block 118 may use an 8-bit gray level range and convert to an 8-bit voltage domain range.

At block 204, the MSPUC block 118 may determine and apply the compensation to the source image data 102 in the voltage domain. In certain instances, the MSPUC block 118 determine a global voltage compensation value based on one or more global compensation maps and apply the global voltage compensation value to the source image data 102 to generate the compensated image data 122. The global voltage compensation value may be any suitable number of bits, such as 8-bits, 9-bits, 10-bits, 11-bits, 12-bits, 13-bits, 14-bits, and so on. In other instances, the MSPUC block 118 may also determine a local voltage compensation value based on one or more local compensation maps and a gain. For example, the MSPUC block 118 may apply a voltage-dependent gain to the local compensation map. The MSPUC block 118 may apply the local voltage compensation value to the source image data 102 to generate the compensated image data 122. The local voltage compensation value may be any suitable number of bits, such as 8-bits, 9-bits, 10-bits, 11-bits, 12-bits, 13-bits, 14-bits, and so on. Still in other instances, the MSPUC block 118 may apply both the global voltage compensation value and the local voltage compensation value to the source image data 102 to generate the compensated image data 122.

By way of example, the global voltage compensation value may be 9-bits and the local voltage compensation value may be 9-bits. Applying both the global voltage compensation value and the local voltage compensation value to the source image data 132 may expand the voltage domain range illustrated in the block 202. In addition, due to pixel to pixel variation, the distribution of voltages may be greater after applying the compensation in comparison to input values (e.g., at block 200). Indeed, the voltage domain range illustrated by block 210 may be larger in comparison to the voltage domain range illustrated by block 202. That is, the voltage values corresponding to the zero emission range may be unchanged and remaining voltage values may be compensated. By way of example, the zero emission range may correspond to lower voltage values such as 0 Volts (V), 1 V, 2 V, 3 V, and so on and the expanded voltage domain range may include higher voltage values. In another instances, the zero emission voltage values may be at a high voltage value and the expanded voltage values may be low voltage values. For example, the zero emission voltage values may correspond to 1400 V, 1600V, 1800V, and so on.

At block 212, the MSPUC block 118 may convert the compensated image data 122 from the expanded voltage domain range to gray level. For example, the MSPUC block 118 may use a voltage-to-digital code (V2D) LUT 260 to reverse conversion from voltage to digital code, which may be the compensated image data 122. The V2D LUT 260 may include 16 entries per color component, which may be programmable. The V2D LUT 260 may dependent on current frame brightness and temperature. For example, the display panel 106 temperature may change as a result of panel self-heating or heat from other system components within the electronic device 10. In certain instances, the panel temperature may change at a rate below 0.2 degrees per seconds, 0.3 degrees per second, 0.4 degrees per second, and so on. As such, the MSPUC block 118 may update the V2D LUT 260, such as when the MSPUC block 118 updates the G2V LUTs 242 in block 200. Since the compensated image data 122 may include an expanded voltage domain range, the V2D LUT 260 may be an extended version of the G2V LUTs 260 that tracks the range and resolution of the G2V LUTs 260 with additional margins for pixel to pixel variation. Accordingly, the MSPUC block 118 may use the V2D LUT 260 to convert the compensated image data 122 from the voltage domain to the gray level domain.

The V2D LUT 260 may support interpolation between entries and extrapolation from one or more entries. In certain instances, the V2D LUT 260 may decrease a precision of the compensated image data 122 to a precision supported by the display panel 106. By way of illustrative example, the display panel 106 may be an 8-bit panel and/or the panel characterization of the gamma DAC may include an 8-bit gray level range. That is, the display pixels 114 may be programmed using gray levels 0-256, which may be a portion of the values within the 14-bit voltage domain range. As such, the 14-bit voltage domain range may be compressed into an 8-bit gray level range to be programmed into the display pixels 114. Although the voltage domain range may be compressed, the digital values of the compensated image data 122 may be 14-bits.

To this end, the V2D LUTs 260 may include four regions, which may be similar to the G2V LUTs 242. For example, the V2D LUT 260 may include the zero emission range, which may not be interpolated to determine the gray level equivalent. The V2D LUT 260 may also include a first region, a second region, and a third region. The first region of the V2D LUT 260 may include voltages within a threshold range, such as an 8-bit gray level range. For example, the first region may span from a first voltage level to a second voltage level, such as compensated voltage equivalents of gray level 1 to gray level 255. The first region may be characterized by a piecewise linear voltage to digital code encoding that includes information associated with the conversion from the voltage domain to the gray level domain. The panel characterization may include a voltage-to-digital code relationship that may be linear or non-linear. In certain instances, the voltage-to-digital code relationship may be linear with additional values to generate a non-linear relationship. In other instances, the voltage-to-digital code relationship may include a high order polynomial that may be determined based on spline fitting.

The second region and the third region may be extrapolated from the first region. For example, the second region may include voltage values below the values of the first region and the third region may include voltage values above the values of the first region. The MSPUC block 118 may determine digital values of the second region by extrapolating from the first region. For example, the second region may include digital values equivalent to 1. In addition, the MSPUC block 118 may determine digital values of the third region may extrapolating from the first region. For example, the third region may include digital values equivalent to 16383 or 24-1. The converted digital values may be 14-bits. In other instances, the converted digital value may be any suitable number of bits, such as 8-bits, 9-bits, 10-bits, 11-bits, and so on. In this way, the MSPUC block 118 may determine the compensation and apply the compensation to the source image data 102 to generate the compensated image data 122. As such, the compensated image data 122 may include display pixel 114 corrections such that visual artifacts may be reduced or eliminated.

Figure 10:
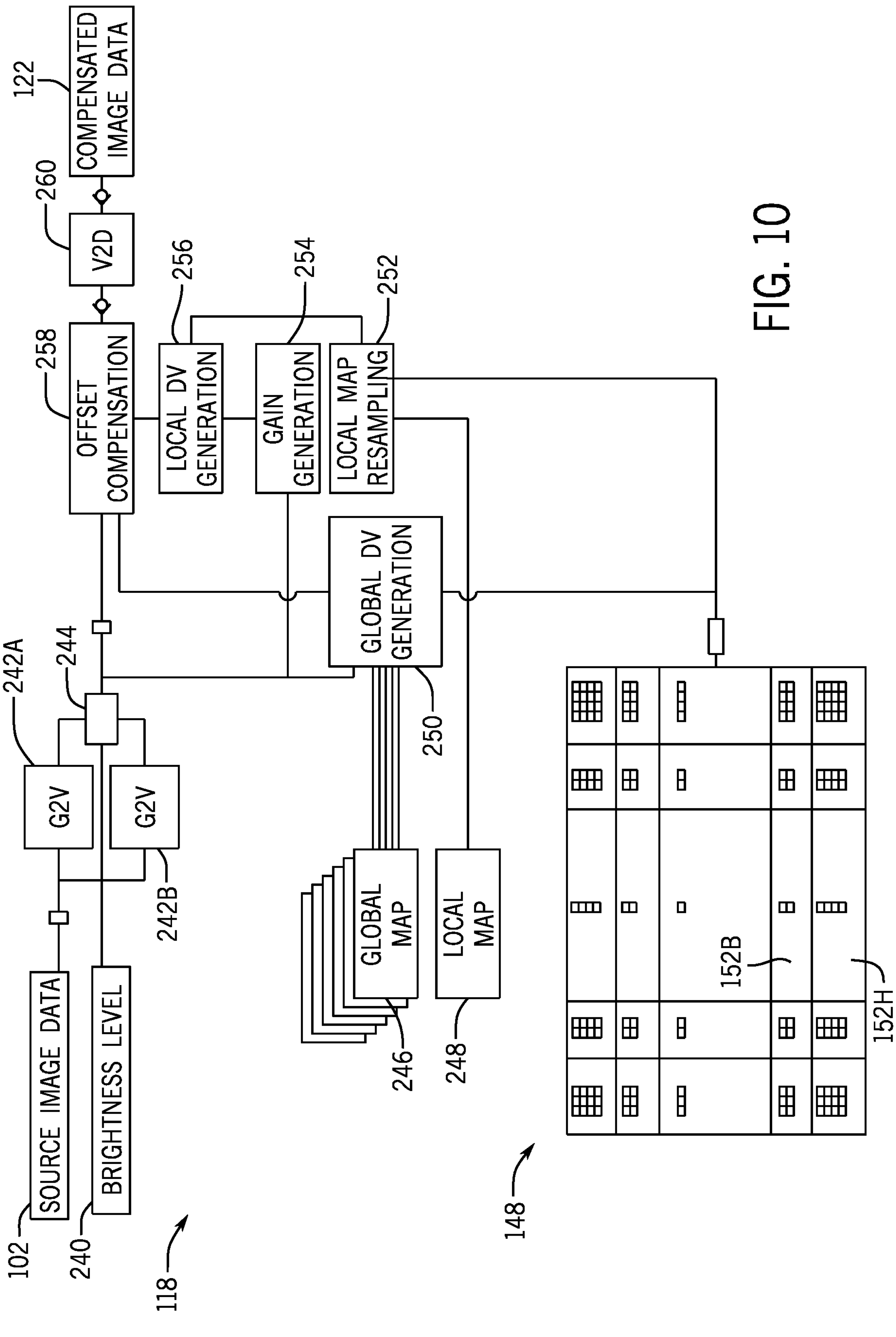
FIG. 10 is a block diagram schematically illustrating the image processing circuitry of FIG. 7, in accordance with an embodiment.
Figure 11:
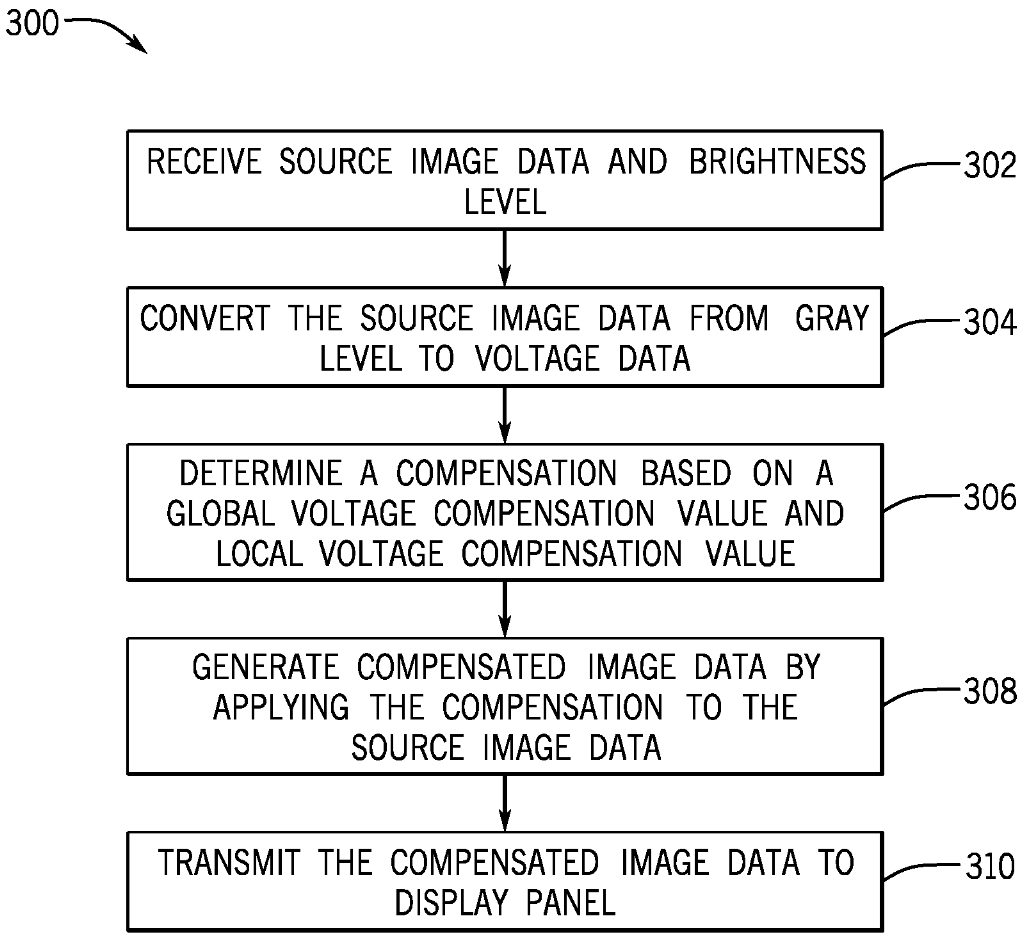
FIG. 11 is a flowchart of an example process or method for applying a compensation to a digital code, in accordance with an embodiment.
Figure 14:
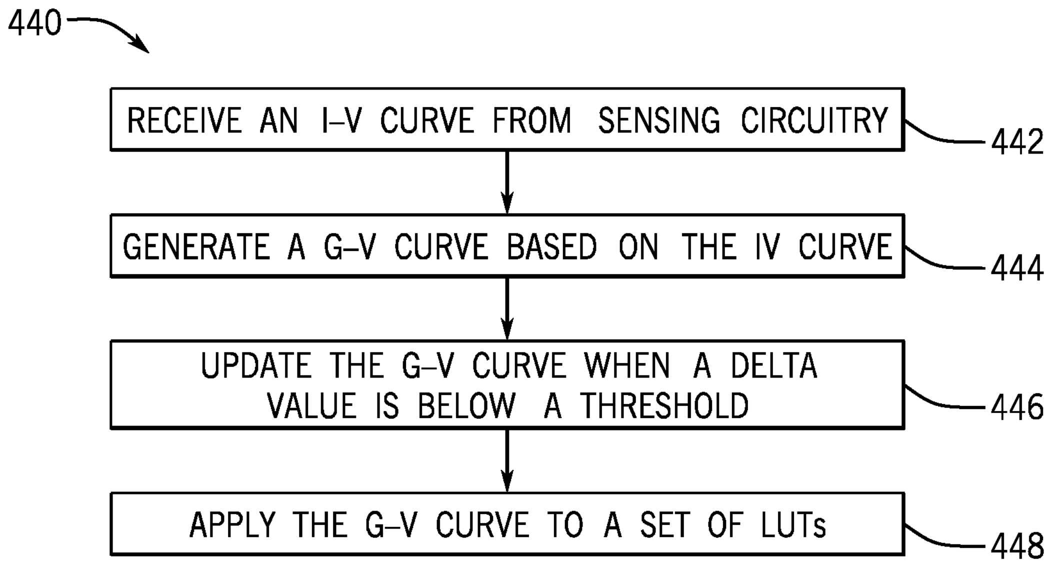
FIG. 14 is a flowchart of an example process or method for programming the gray-to-voltage lookup table and/or the voltage-to-digital code lookup table in a closed loop mode, in accordance with an embodiment.

FIG. 10 is a block diagram schematically illustrating the MSPUC block 118 implemented within the image processing circuitry 100 of the electronic device 10. In particular, the MSPUC block 118 may determine and apply a compensation to the source image data 102 in the voltage domain to compensate for non-uniformity of the display pixels 114. FIG. 14 is a flowchart of an example method 300 for generating compensated image data 122 to provide for display pixel 114 uniformity. To facilitate discussion, FIGS. 10 and 11 are discussed together below. The method 300 may be performed by processing circuitry, such as the processor core complex 18, image processing circuitry 100, and the like. While the method of FIG. 11 is described using process blocks in a specific sequence, it should be understood that the present disclosure contemplates that the described process blocks may be performed in different sequences than the sequence illustrated, and certain described process blocks may be skipped or not performed altogether.

With the foregoing in mind, the display panel 106 may be a foveated display that includes one or more portions with respective panel characteristics (e.g., foveation data). The display panel 106 may include the central foveation region 150 and one or more outer foveation regions 152 that may be divided by horizontal group boundaries and vertical group boundaries. Within the outer foveation regions 152, the display pixels 114 may be grouped such that a first display pixel 114 may be an anchor display pixel and other pixels may be a native display pixel. The anchor display pixel may be programmed with the compensated image data 122. Then, both the native display pixel and the anchor display pixel may be driven to emit light to generate the image frame. For example, the second outer foveation region 152B includes one anchor display pixel 114 and one native display pixel while the eighth outer foveation region 152H includes one anchor display pixel and three native display pixels. As will be appreciated, the foveated nature of the display panel 106 may allow the MSPUC block 118 to skip reading certain display pixel rows for the outer foveation regions 152, thereby improving memory bandwidth and compensation operations.

At process block 302, the MSPUC block 118 may receive source image data 102 and a brightness level 240. The MSPUC block 118 may receive the source image data 102 (e.g., gray level data) from the image data source 104. For example, the image data source 104 may be a panel response correction (PRC) block that outputs the image data. The source image data 102 may include a suitable number of bits, such as 8 bits per component (bpc), 9 bpc, 10 bpc, 11 bpc, 12 bpc, 13 bpc, 14 bpc, and so on. The MSPUC block 118 may also receive a brightness level 240 of the display panel 106. The brightness level 240 (e.g., display brightness value) may include a measurement of light (e.g., brightness, luminance) being emitted by the display panel 106. The brightness level 240 may dynamically change over time based on ambient light conditions (e.g., from an external environment), image content displayed, and the like. For example, the MSPUC block 118 may receive brightness level 240 from sensing circuitry of the display panel 106. Additionally or alternatively, the MSPUC block 118 may receive a current-voltage characteristic of the display panel 106 from the sensing circuitry and determine the brightness level 240 based on the current-voltage characteristic.

At process block 304, the MSPUC block 118 may convert the source image data 102 from gray level to voltage data. The MSPUC block 118 may use a set of G2V LUTs 242 to convert the source image data 102. The G2V LUTs 242 may include a relationship between gray level and voltage data. By way of illustrative example, the G2V LUT 242 may include 258 entries that span a 14-bit gray level input code. A first entry may include an equivalent voltage code corresponding to gray level 0. A second entry may include an equivalent voltage code corresponding to gray level 1. A last entry of the G2V LUT 242 may correspond to a maximum value of the 14-bit gray level input code, or 24-1. The G2V LUTs 242 may include any suitable number of entries that span any number of bits. Additionally or alternatively, the MSPUC block 118 may use a G2V LUT 242 for each sub-pixel value (e.g., component). For example, a first G2V LUT 242 may be used for a red component, a second G2V LUT 242 may be used for a blue component, and a third G2V LUT 242 may be used for a green component.

The G2V LUTs 242 may be dependent on the brightness level 240 and may programmed based on the brightness level 240. For example, the MSPUC block 118 may program a first G2V LUT 242A based on a first brightness level less than the brightness level 240 and a second G2V LUT 242B based on a second brightness level greater than the brightness level 240. If the brightness level may be 250 nits. The first G2V LUT 242A may be programmed based on 200 nits and the second G2V LUT 242B may be programmed based on 300 nits. As such, the MSPUC block 118 may determine a first voltage code based on the first G2V LUT 242A and a second voltage code based on the second G2V LUT 242B. At interpolation block 244, the MSPUC block 118 may interpolate between the first voltage code and the second voltage code to determine a voltage equivalent for the gray level of the source image data 132. Although the illustrated example uses a dependence on brightness level 240, the LUTs 242 may also depend on temperature, operating characteristics of the panel circuitry, panel characteristics, and the like.

At process block 306, the MSPUC block 118 may determine a compensation based on a global voltage compensation value and/or a local voltage compensation value. For example, the MSPUC block 118 may determine the global voltage compensation value based on one or more global compensation maps 246 and/or the local voltage compensation value based on one or more local compensation maps 248.

To this end, the MSPUC block 118 may retrieve one or more global compensation maps 246 (e.g., low spatial resolution map) from storage (e.g., memory 20, storage device(s) 22, the controller memory 110). For example, the global compensation maps 246 may be down-sampled, packed, and stored in a single memory buffer based on foveation data. The global compensation maps 246 may provide compensation for non-uniformities that occur with low spatial frequency within the display panel 106. In addition, the global compensation map 246 may include three voltage values for the red component, the blue component, and the green component. The global compensation maps 246 may be generated during panel calibration by driving a voltage through each of the display pixels 114 and measuring brightness level 240 of the display panel 106. For example, multiple global compensation maps 246 may be characterized at a respective voltage value. At the global voltage compensation generation block 250, the MSPUC block 118 may determine the global voltage compensation value based on the global compensation maps 246. For example, the MSPUC block 118 may upsample the global compensation maps 246 based on the foveation data, such as the grouped frames of the display panel 106. The MSPUC block 118 may determine the global voltage compensation value by interpolating between or extrapolating from two or more global compensation maps 248.

At the local map resampling block 252, the MSPUC block 118 may upsample a local compensation map 248. For example, the MSPUC block 118 may retrieve one or more local compensation map 248 from storage and upsample the local compensation maps 248 based on the display panel 106 characteristics, such as foveation data. The local compensation map 248 (e.g., high spatial resolution map) captures non-uniformities with higher spatial frequencies in comparison to spatial frequencies of the global compensation maps 246. For example, the local compensation map 248 may include non-uniformities from one display pixel 114 to another display pixel 114. In another example, the local compensation map 248 may capture non-uniformities may occur from a group of display pixels 114 to another group of display pixels 114.

At the gain generation block 254, the MSPUC block 118 may determine a gain for the local compensation map 248. The gain may be a voltage-dependent gain for the values of the local compensation map 248. For example, a cubic polynomial relationship and a current voltage value of the display pixel 114 may be used to determine the gain. In certain instances, the gain may be generated for each foveated region 150 and 152 of the display panel 106.

At the local voltage compensation generation block 256, the MSPUC block 118 may determine a local map compensation value based on a pixel location and the upsampled local compensation map 248 at block 252. In certain instances, the MSPUC block 118 may increase memory bandwidth by reading a portion of the display pixel lines within the local compensation map 248. For example, the MSPUC block 118 may read every other display pixel line when upsampling the local compensation map 248 for an outer foveation region 152, thereby improving operation efficiency. In another example, the MSPUC block 118 may read every display pixel line when upsampling a portion of the location compensation map 248 for the central foveation region 152 to improve pixel resolution within the region. As further described with respect to FIG. 22, the MSPUC block 118 may determine the foveation data of the display panel 106, then upsample the local compensation map 248 based on the foveation data.

At the offset calculation block 258, the MSPUC block 118 may determine the compensation to be applied to the source image data 102. The offset compensation voltage may be generated based on the global compensation map 246, the local compensation map 248, or both. For example, the MSPUC block 118 may include a registered with the compensation mode, which controls a combination of global compensation maps 246 and/or local compensation maps 248 used. For example, if the compensation mode is 0, both the global compensation map 246 and the local compensation map 248 may be used. If the compensation mode is 1, only the global compensation map 246 may be used to generate the compensation. In this case, the global compensation maps 246 may be down-sampled by a factor of 8, 12, 16, 24, or any suitable factor. If the compensation mode is 2, only the local compensation map 248 may be used to generate the compensation. In this case, the local compensation map 248 may be down-sampled by a factor of 2, 4, 8, 12, 16, 16, or any suitable factor.

When the compensation mode is 0, the global compensation map 246 may be down-sampled by a factor greater than a factor used for the local compensation map 248. In this way, the local compensation map 248 may include a higher resolution and/or include more spatial information than the global compensation map 246. For example, if the local compensation map 248 may be down-sampled by a factor of 4 in the horizontal direction, the MSPUC block 118 may select a global compensation map 246 that may be down-sampled by a factor of 8, 12, 16, 24, or more in the horizontal direction. In another example, if the local compensation map 248 may be down-sampled by a factor of 12 in the vertical direction, the MSPUC block 118 may select a global compensation map 246 that may be down-sampled by a factor of 16, 24, or more in the vertical direction.

At process block 308, the MSPUC block 118 may generate compensated image data 122 by applying the compensation to the source image data 102. For example, the MSPUC block 118 may apply a compensation for each display pixel value of the source image data 168. In this way, the MSPUC block 118 may adjust the voltage value to provide for display pixel uniformity.

The MSPUC block 118 may use a V2D LUT 260 to convert the compensated image data 122 from the voltage domain to the gray level domain. For example, the V2D LUT 260 that includes a voltage to digital code relationship. The V2D LUT 260 may include 16 entries per color component and each entry may be programmable in terms of LUT coordinates and LUT entry values. The V2D LUT coordinates may be monotonically decreasing. In certain instances, the MSPUC block 118 may update the V2D LUT 260 based on a current frame brightness and temperature. The uniformity compensation may be maintained regardless of panel temperatures, current characteristics, changes to the brightness value, voltage characteristics, and the like.

At process block 310, the MSPUC block 118 may transmit the compensated image data 122 to a display driver. For example, the MSPUC block 118 may transmit the compensated image data 122 to driver circuitry to program the display pixels 114. Programming the display pixels 114 with the compensated image data 122 may reduce or eliminate perceivable image artifacts.

Figure 12A:
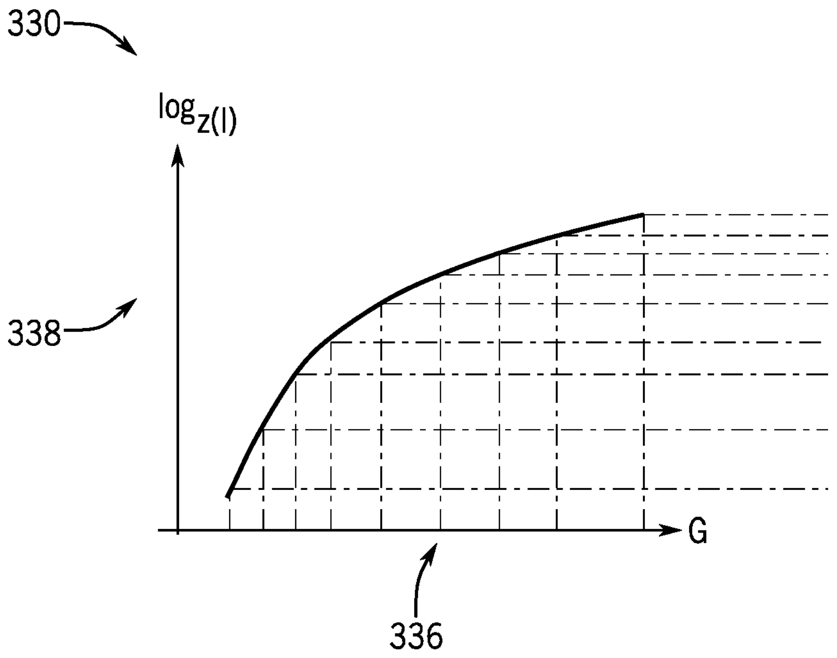
FIG. 12A is a graph illustrating a relationship between current and gray level for the electronic display of FIG. 8, in accordance with an embodiment.
Figure 12B:
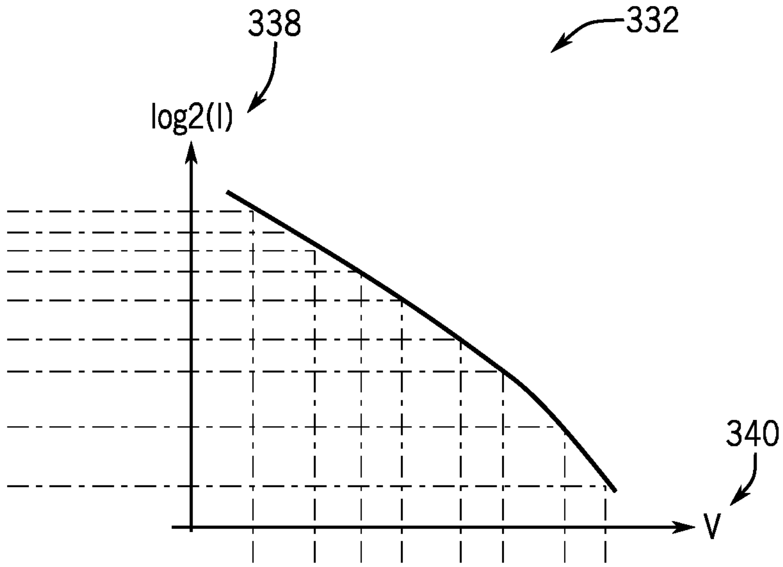
FIG. 12B is a graph illustrating a relationship between current and voltage for the electronic display of FIG. 8, in accordance with an embodiment.
Figure 12C:
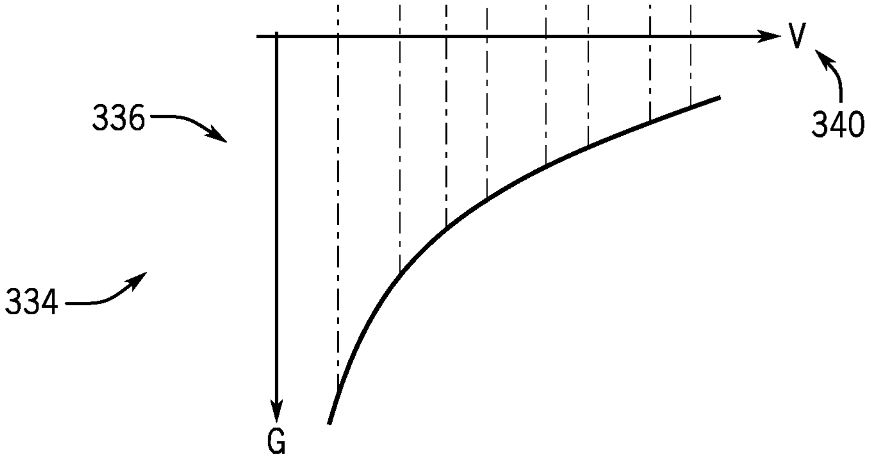
FIG. 12C is a graph illustrating a relationship between gray level and voltage for the electronic display of FIG. 8, in accordance with an embodiment.

FIGS. 12A-C illustrate a first graph 330, a second graph 332, and a third graph 334 illustrating brightness-to-data relationships. The brightness may be represented as a gray level 336. A lower gray level 336 (e.g., smaller gray level value) may represent less light being emitted by the display pixel 114 while a higher gray level 336 (larger gray level value) may represent more light being emitted. For an 8-bit image data, a gray level of 0 may correspond to zero emissions by the display pixel 114 while a gray level of 255 may correspond to maximum emissions. It may be understood that gray levels account for color sensitivity of human eyes and increments from one gray level to another gray level may be a non-linear. The data variables may include current 338 and voltage 340. In certain instances, the data variables may include power, such as in a brightness-to-power relationship. The predicted brightness-to-data relationship may be determined by sensing circuitry within the display panel 106 or predicted based on panel characteristics.

With the foregoing in mind, FIG. 12A is the graph 330 illustrating a brightness-to-current relationship for a display pixel 114. The graph 330 illustrates a non-linear relationship, such as a logarithmic relationship, between current values 338 and gray level values 336 for a display pixel 114. The brightness-to-current relationship may be determined at manufacturing during panel calibration. For example, sensing circuitry may determine an amount of current values 338 driving a respective display pixel 114 and image capturing devices may capture an image of the display panel 106 to determine the gray level 336. In another example, optical calibration data may be used to determine a particular gray level 336 corresponding to the driving current 338. The brightness-to-current relationship may depend on brightness level 240 (e.g., display brightness value) of the display panel 106 and panel temperature. To this end, one or more brightness-to-current relationships may be determined at respective brightness levels 240 and/or respective temperatures.

FIG. 12B is a graph 332 illustrating a current-to-voltage relationship for a display pixel 114. The graph 332 illustrates a non-linear relationship, such as a logarithmic relationship, between the current values 338 and the voltage values 340. The current-to-voltage relationship may depend on brightness level 240, the temperature of the display panel 106, and/or depend on panel characteristics. For example, the current-to-voltage relationship may be a characteristic of display panel circuitry and may depend on brightness level 240. In certain instances, the current-to-voltage relationship may be determined during panel calibration by sensing circuitry. For example, one or more current-to-voltage relationships may be determined based on respective brightness levels 240 and/or temperatures. In other instances, the processing circuitry may determine the current-to-voltage relationship based on the brightness-to-current relationship illustrated in FIG. 12A. For example, the MSPUC block 118 may use target current values at a brightness level 240 to determine equivalent voltage values 340.

FIG. 12C is a graph 334 illustrating a brightness-to-voltage relationship for a display pixel 114. The graph 334 illustrates a non-linear relationship between gray level 336 and voltage value 340, which may be derived from the graphs 330 and 332. The brightness-to-voltage relationship may be determined based on the current-to-voltage relationship, the brightness-to-current relationship, or the like. For example, the MSPUC block 118 may use target voltage values at a brightness level 240 to determine equivalent gray levels 336. The brightness-to-voltage relationship may be dependent on brightness level 240. The graph 334 may be used to determine voltage corresponding to a target gray level. The processing circuitry may determine a voltage for driving the panel circuit current to get the light emissions such that the light emission of the display pixel matches the target gray level. As such, the processing circuitry may determine the compensation in the voltage domain and apply the compensation to each display pixel 114.

Figure 13:
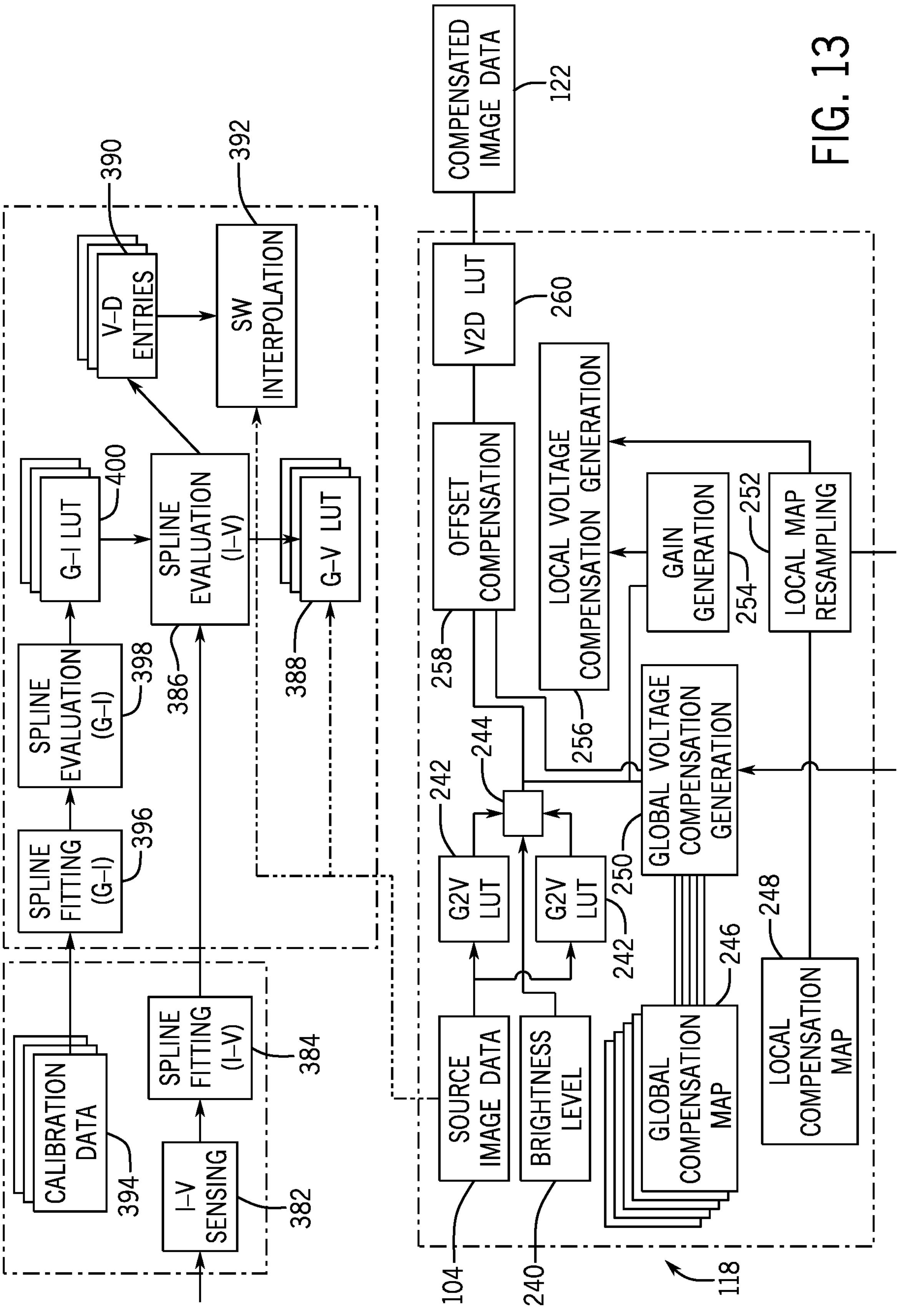
FIG. 13 is a block diagram schematically illustrating the image processing circuitry of FIG. 7 programming a gray-to-voltage lookup table and/or a voltage-to-digital code lookup table based on brightness-to-data relationship, in accordance with an embodiment.
Figure 15:
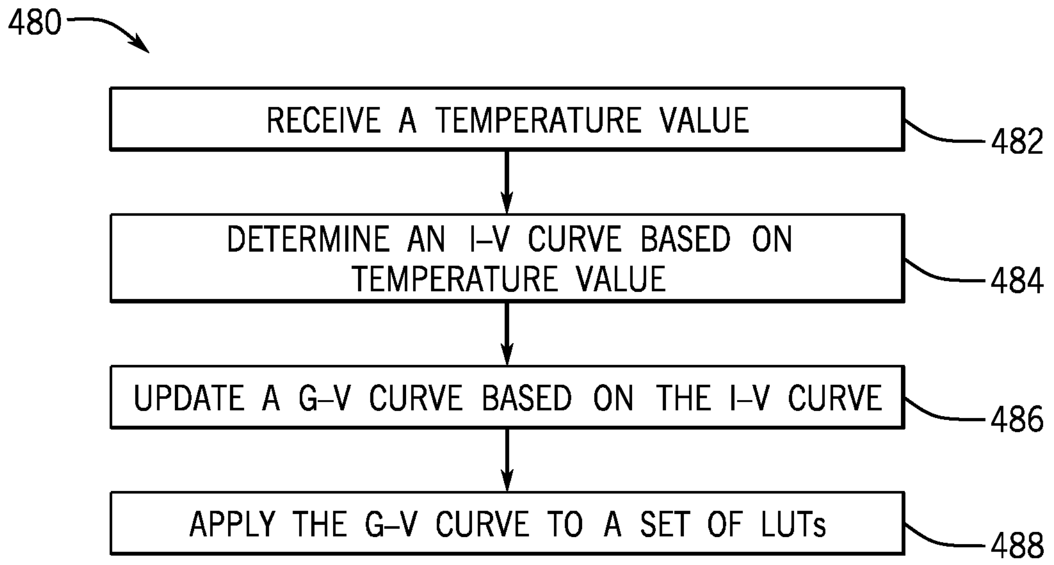
FIG. 15 is a flowchart of an example process or method for programming the gray-to-voltage lookup table and/or the voltage-to-digital code lookup table in an open loop mode, in accordance with an embodiment.

With the foregoing in mind, FIG. 13 is a block diagram schematically illustrating the MSPUC block 118 programming the G2V LUTs 242 and/or the V2D LUT 260 based on the brightness-to-data relationship. The MSPUC block 118 may use the brightness level 240 and the brightness-to-data relationship to program the LUTs in either a closed loop mode or an open loop mode. FIG. 14 is a flowchart of an example method 440 for programming the LUTs in the closed loop mode and FIG. 15 is a flowchart of an example method 480 for programming the LUTs in the open loop mode. For purposes of discussion, FIGS. 13, 14, and 15 will be discussed together below. The methods of FIGS. 14 and 15 may be performed by processing circuitry, such as the processor core complex 18, image processing circuitry 100, and the like. While the methods of FIGS. 14 and 15 are described using process blocks in a specific sequence, it should be understood that the present disclosure contemplates that the described process blocks may be performed in different sequences than the sequence illustrated, and certain described process blocks may be skipped or not performed altogether.

When operating in the closed loop mode, the MSPUC block 118 (e.g., via processing circuitry) may receive current-to-voltage data from sensing circuitry and update the LUTs based on the received data. At process block 442, the MSPUC block 118 may receive current-to-voltage sensing data 382 (e.g., current-to-voltage relationship) from sensing circuitry within the display panel 106. For example, the MSPUC block 118 may receive current values from the sensing circuitry and determine the equivalent voltage values. In another example, the sensing circuitry may generate current-to-voltage data based on the panel characteristics. Still in another example, temperature changes within the display panel 106 may cause the current-to-voltage relationship to change. The current-to-voltage data may be periodically updated to account for display panel 106 operating characteristics. For example, the MSPUC block 118 may receive updated current-to-voltage data every 1 second, 2 seconds, 3, seconds, 4 seconds, 5 seconds, or more to generate updated brightness-to-data relationships.

At a spline fitting block 384, the MSPUC block 118 may fit the current-to-voltage sensing data 382 to a current-to-voltage spline. For example, the spline may include a current-to-voltage relationship at a respective brightness level 240, such as the current-to-voltage relationship described with respect to FIG. 12B. The MPSUC block 166 may determine one or more spline coefficients based on the spline fitting. At a spline evaluation block 386, the MSPUC block 118 may evaluate the fitted spline. For example, The MSPUC block 118 may perform a binary search for a curve segment corresponding to the current value and/or the coefficient value, compute a distance from segment end points, and retrieve spline curve segment coefficients. The MSPUC block 118 may use any suitable number of segments, such as 10 or more, 20 or more, 30 or more, 40 or more, and so on, for the spline fitting for a continuous, smooth, and/or differential curve.

At process block 444, the MSPUC block 118 may generate brightness-to-voltage curve based on the current-to-voltage curve. For example, the electronic device 10 may store the brightness-to-voltage relationship in one or more G-V LUTs 388. The G-V LUTs 388 may be generated at manufacturing and each G-V LUT 388 may be generated based on a respective brightness level and/or color component. For example, 30 G-V LUTs 388 may be generated for 10 different brightness levels and 3 color components. For example, a first G-V LUT 388 may include 258 entries at a first brightness level for a red component, a second G-V LUT 388 may include 258 entries at a second brightness level for a blue component, and a third G-V LUT 388 may include 258 entries at a third brightness level. While the illustrated example uses brightness levels, the G-V LUT 388 may be generated based on temperature value. In addition, the MSPUC block 118 may update one or more V-D LUT 390, which may be subsequently used to program the V2D LUT 260. The V-D LUTs 390 may be generated based on a respective brightness level and/or color component. By way of example, each V-D LUT 390 may include 16 non-uniform entries corresponding to the voltage-to-digital code relationship. At the SW Interpolation block 392, the MSPUC block 118 may interpolate between entries of the V-D LUT 390 to determine values for programming the V2D LUT 260.

At process block 446, the MSPUC block 118 may update the G-V curve when a delta value is below a threshold. The delta may be a change in temperature, change in current, or a change in voltage. For example, the MSPUC block 118 may determine that a 0.2 degree Celsius change may impact brightness levels 240. If the temperature change is greater than 0.2 degree Celsius, then the MSPUC block 118 may not update the G2V LUTs 242. The MSPUC block 118 may return to the process block 442 to receive current-to-voltage data from sensing circuitry. If the temperature change is less than 0.2 degree Celsius, then the MSPUC block166 may apply the G-V curve to the LUTs, which may include the G2V LUTs 242 and the V2D LUT 260.

At process block 448, the MSPUC block 118 may apply the G-V curve to the LUTs. For example, the MSPUC block 118 may use the G-V curve to update the first G2V LUTs 242A and the second G2V LUTs 242B based on values within the G-V LUT 388. In another example, the MSPUC block 118 may use the V-D LUT 390 to update the V2D LUT 260. As such, the compensation may be determined based on current panel characteristics, such as brightness level 240, temperature, current-to-voltage data, and the like.

When operating in the open loop mode, the MSPUC block 118 may not receive current-to-voltage data and receive a temperature value. As the electronic device 10 operates, the display panel 106 and/or components within the electronic device 10 may generate heat, which may impact the current-to-voltage relationship.

At process block 482, the MSPUC block 118 may receive a temperature value at process block 482. The MSPUC block 118 may receive a temperature value from sensing circuitry within the display panel 106.

At process block 484, the MSPUC block 118 may determine an I-V curve based on the temperature value. For example, the MSPUC block 118 use calibration data 394 to determine the brightness-to-current relationship. The calibration data 394 may include pre-characterized current-to-voltage curves generated at a respective anchor temperature. For example, the calibration data 394 may include four pre-characterized I-V graphs at a first temperature value, a second temperature value, a third temperate value, and a fourth temperature value. The MSPUC block 118 may receive the temperature and compare the temperature to the four temperature values to determine if the current-to-voltage curve may be updated. In another example, the calibration data 394 may include 10 LUTs with a relationship between brightness-to-current. The LUTs may be generated based on a respective brightness level 240, a color component, a temperature value, and the like. The calibration data 394 may include optical calibration data of the display pixels 114 at different brightness levels 240. For example, the optical calibration data may include optical images of the display panel at gray level 10, gray level 50, gray level 100, gray level 200, gray level 250, and so on. The calibration data 394 may be generated during manufacturing, such as during a panel calibration operation. The MSPUC block 118 may determine the calibration data 394 (e.g., a LUT) used for determining the current-to-voltage relationship based on the temperature value.

During operations, the MSPUC block 118 may determine the temperature value may have changed such that the delta value is greater than the threshold. As such, the MSPUC block 118 may update the current-to-voltage relationship based on the calibration data 394. In certain instances, the MSPUC block 118 may determine the delta value to be below the threshold. As such, the MSPUC block may not retrieve calibration data 394 and the MSPUC block 118 may return to process block 484 to receive a temperature value.

At a spline fitting block 396, the MSPUC block 118 may fit the calibration data 394 to a brightness-to-current relationship. For example, the MSPUC block 118 may determine one or more parameter arrays and determine the spline function based on the parameter arrays. The spline function may be a cubic polynomial using four parameter arrays. The MSPUC block 118 may fit any suitable number of segments to fit the calibration data 394. That is, the MSPUC block 118 may fit the calibration data 394 using N segments. Each segment may be continuous such that endpoints of any two consecutive segments match. The first derivative of the N segments may be continuous such that the first derivatives at the endpoints of any two consecutive segments may match. Moreover, the second derivative of the N segments may be continuous. In this way, the brightness-to-current relationship may be continuous, smooth, and differentiable. As such, the brightness-to-current relationship may capture a non-linear relationship between driver circuit current and light emissions of the display pixels 114.

At the spline evaluation block 398, the MSPUC block 118 may evaluate the brightness-to-current spline fitting. For example, the MSPUC block 118 may perform a binary search for a curve segment, compute a distance between the segment endpoints, and retrieve spline curve segment coefficients to create the spline. The MSPUC block 118 may evaluate the spline using a log(current) value to determine equivalent gray levels. For example, the MSPUC block 118 may determine 258 gray level entries at a respective brightness level 240 and a respective color component. In certain instances, the MSPUC block 118 may determine gray level entries for 10 different brightness levels and 3 color components. The MSPUC block 118 may populate a G-I LUT 400 using the spline, such as the gray level entries determined from the spline.

At process block 486, the MSPUC block 118 may update the brightness-to-voltage curve based on the current-to-voltage relationship. The MSPUC block 118 may use the G-I LUT 400 to determine the current-to-voltage relationship. For example, the MSPUC block 118 may use spline fitting to determine the current-to-voltage relationship, such as at the spline fitting block 384. At process block 488, the MSPUC block 118 apply the brightness-to-voltage relationship to the G2V LUT 242, the V2D LUT 260, or both, similar to process block 448.

Figure 16:
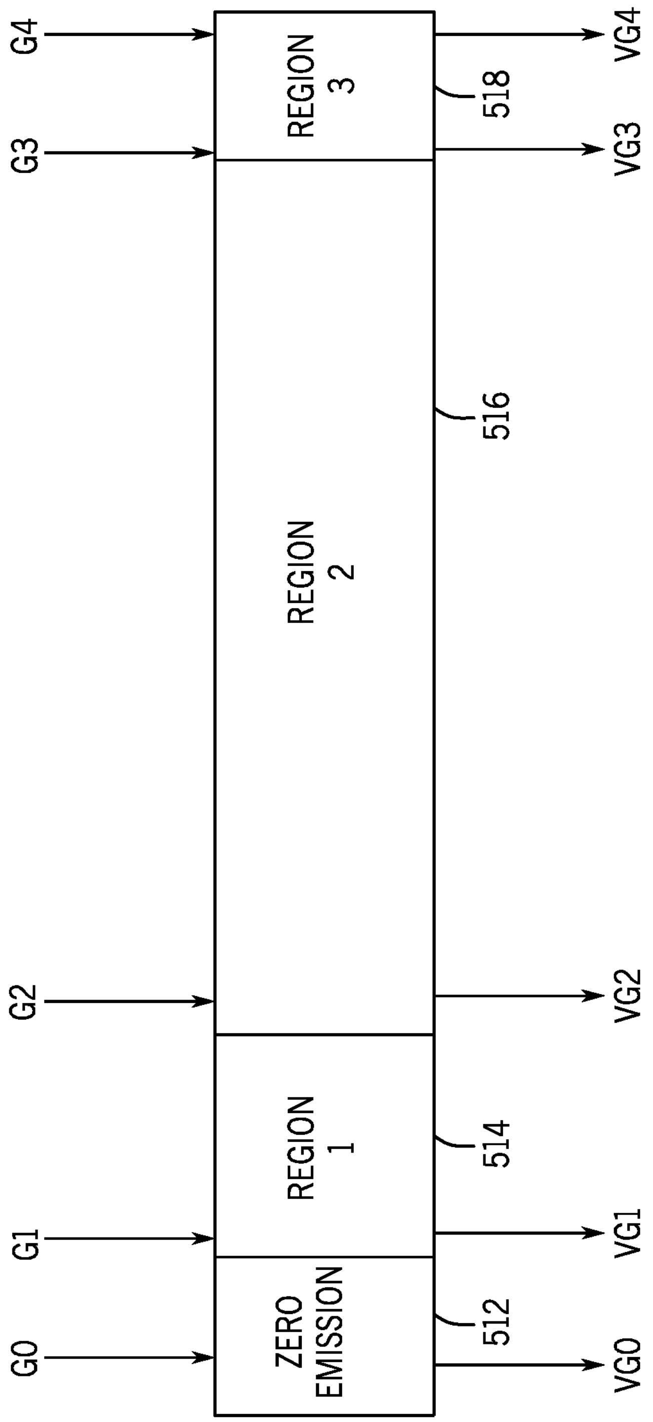
FIG. 16 is a block diagram schematically illustrating the gray-to-voltage lookup table divided into a zero emission range, a first region, a second region, and a third region, in accordance with an embodiment.

FIG. 16 is a block diagram schematically illustrating the G2V LUT 242 divided into a zero emission region 512, a first region 514, a second region 516, and a third region 518. By way of example, the G2V LUTS 242 may include 258 entries that span the 14-bit gray level range. Each region may be divided such that interpolation between entries may be supported without division, which may improve conversion efficiency. While the illustrated G2V LUT 242 uses a 14-bit gray level range, any suitable number of bits may be programmed into the G2V LUT 242. Moreover, the G2V LUTs 242 may be divided into any suitable number of regions, such as 2 or more regions, 3 or more regions, 5 or more regions, 6 or more regions, and so on.

The zero emission region 512 may include gray level values that correspond to zero emissions by the display pixel 114. For example, the zero emission region 512 may include gray level 0, which may be represented by a gray code G0, and equivalent voltage codes, VG0. In certain instances, the zero emission region 512 may correspond to a first entry of the G2V LUT 242, which may have an index 0. In other instances, the zero emission region 512 may correspond to a last entry of the G2V LUT 242.

The first region 514 may include gray level values above gray level 0 and below a first threshold. The first threshold may be any suitable gray code, voltage code, a number of LUT entries, or the like. For example, the first threshold may correspond to gray level 1 for a 14-bit gray level domain or gray level 64. In another example, the first threshold may be gray level 1 for an 8-bit gray level range. As such, the first region 514 may include gray levels below the 8-bit gray level range, which may be represented by G1 to G2, and equivalent voltage values, such as VG1 and VG2. The first region 514 may include a step value of 63. As such, gray level interpolation within the first region 514 may be performed in a method similar to uniformly spaced LUT.

The second region 516 may include gray level values above the first threshold and below a second threshold. The second threshold may be any suitable gray code, voltage code, a number of LUT entries, or the like. For example, the second threshold may correspond to gray level 255 for a 14-bit gray level domain range or gray level 16230. In this way, the second region 516 may include a full range of 8-bit gray levels. As illustrated, the second region 516 may include gray codes G2 to G2 and corresponding voltage values, such as VG2 to VG3. The second region 516 may include a step value of 64. As such, gray level interpolation within the second region 516 may be performed in a method similar to uniformly spaced LUT.

The third region 518 may include gray levels above the second threshold. For example, the third region 518 may include gray levels above 16320 and equivalent voltage values. In another example, the third region 518 may include gray levels above the 8-bit gray level range. The third region 518 may be include gray codes G3 to G4 and corresponding voltage values, such as VG3 and VG4. The third region 518 may include a step value of 63. As such, gray level interpolation within the third region 518 may be performed in a method similar to uniformly spaced LUT.

It may be appreciated that a size of the regions, a value within the regions, and/or the thresholds may depend on brightness level 240. Indeed, each of the regions may be programmable, such as in the closed loop mode described with respect to FIG. 14 or in the open loop mode described with respect to FIG. 15.

Figure 17:
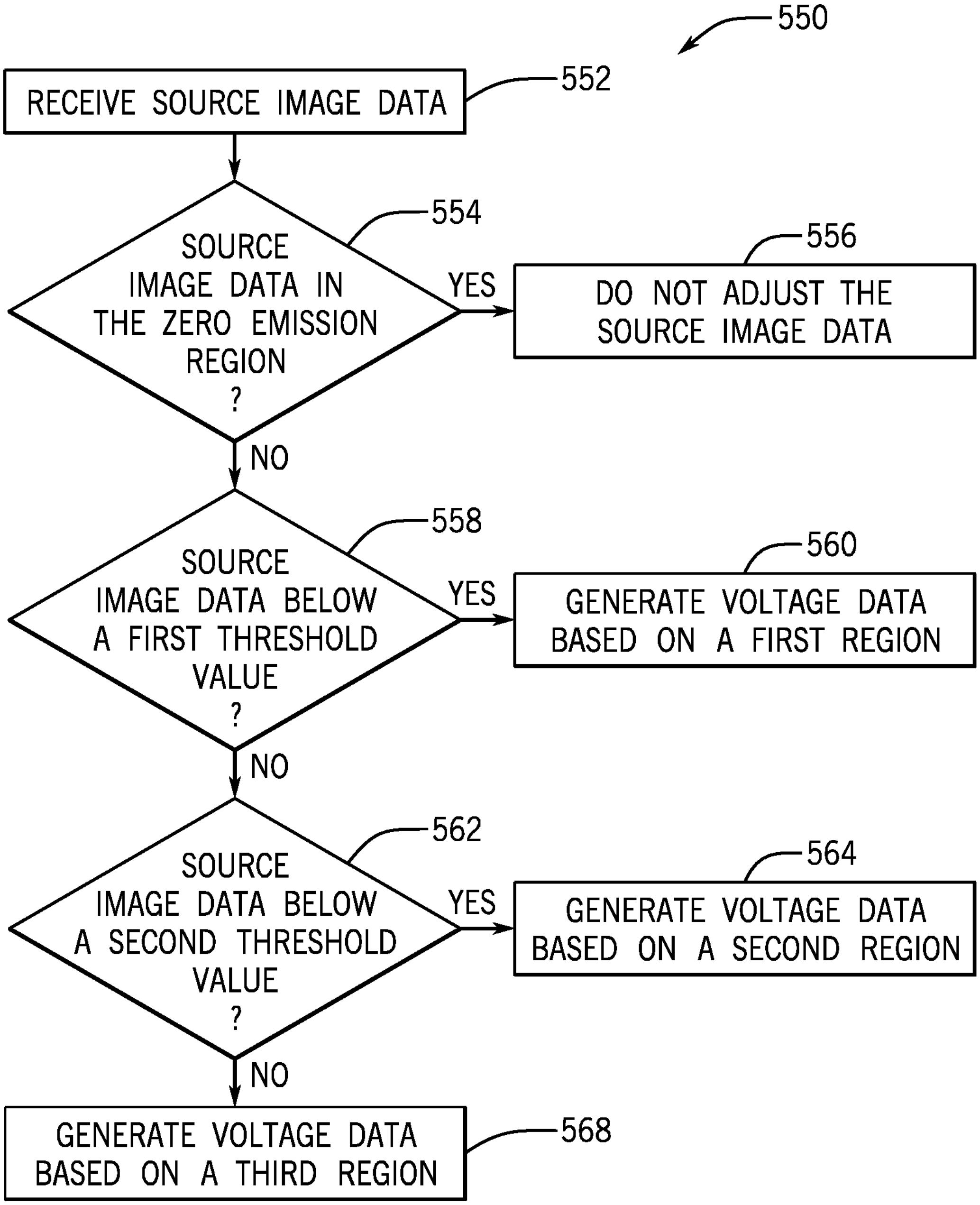
FIG. 17 is a flowchart of an example process or method for generating a compensation for the electronic display of FIG. 8, in accordance with an embodiment.

FIG. 17 is a flowchart of an example method 550 for generating the voltage data based on gray levels of the source image data 102. The method 550 may be performed by processing circuitry, such as the processor core complex 18, image processing circuitry 100, and the like. While the method of FIG. 17 is described using process blocks in a specific sequence, it should be understood that the present disclosure contemplates that the described process blocks may be performed in different sequences than the sequence illustrated, and certain described process blocks may be skipped or not performed altogether.

At process block 552, the MSPUC block 118 may receive source image data 102. For example, the MSPUC block 118 may receive the source image data 102 from the image data source 104. The MSPUC block 118 may determine the gray level for a respective display pixel 114 to convert the source image data 102 from gray level to voltage data.

At determination block 554, the MSPUC block 118 may determine if the source image data 102 is within the zero emission region 512. For example, the MSPUC block 118 may determine if the source image data 102 includes gray code 0, which may correspond to gray level 0.

If the source image data 102 is within the zero emission region 512, then at process block 556, the MSPUC block 118 may not adjust the value. That is, the MSPUC block 118 may not interpolate to determine the voltage value. The MSPUC block 118 may convert the source image data 102 to VG0 to generate the compensated image data 122. As such, the display pixel 114 may not emit light when programmed with the compensated image data 122.

If the source image data 102 is not within the zero emission region, then at determination block 558, the MSPUC block 118 may determine if the source image data 102 is below a first threshold. For example, the MSPUC block 118 may determine if the source image data 102 is below G2.

If the source image data 102 is below the first threshold, then at process block 560, the MSPUC block 118 may generate the voltage data based on the first region 514. For example, the MSPUC block 118 may interpolate entries of the first region 514 to determine the voltage value. The first region 514 may include uniform spacing between entries with reduced register updates. In addition, the first region 514 may support shifting and adding to reduce or eliminate division within the region 514. As such, the MSPUC block 118 may convert the source image data 102 from the gray level domain to the voltage domain.

If the source image data 102 is not below the first threshold, then at determination block 562, the MSPUC block 118 may determine if the source image data 102 is below a second threshold. For example, the MSPUC block may determine if the source image data 102 is below G3.

If the source image data 102 is below the second threshold, then at block 564, the MSPUC block 118 may generate voltage data based on the second region 516. For example, the MSPUC block 118 may interpolate entries of the second region 516 to determine the voltage value. In certain instances, the MSPUC block 118 may shift and/or add within the second region 516 to determine the voltage value. As such, the MSPUC block 118 may convert the source image data 102 from the gray level domain to the voltage domain.

If the source image data 102 is above the second threshold, then at block 568, the MSPUC block 118 may generate voltage data based on the third region 518. For example, the MSPUC block 118 may interpolate between entries of the third region 518 to determine the voltage value. Since each region may include uniform spacing and support interpolation, the MSPUC block 118 may determine the voltage value without division, which may improve operation efficiency and reduce latency. As such, a direct conversion from gray level to voltage values may be supported. Moreover, the MSPUC block 118 may shift and add within the region to determine the voltage value.

Figure 18:
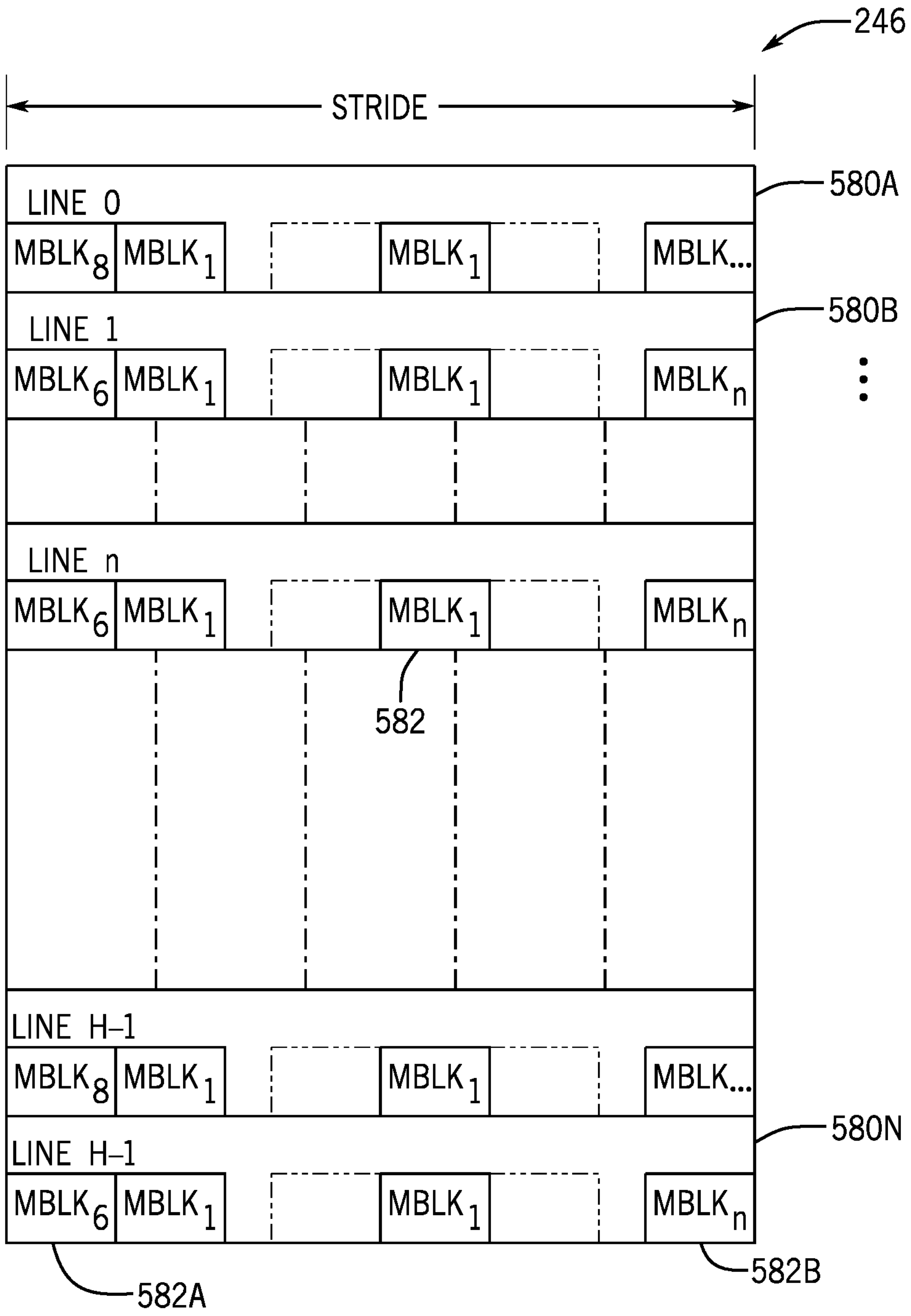
FIG. 18 is a block diagram schematically illustrating a global compensation map for the electronic display of FIG. 8, in accordance with an embodiment.

FIG. 18 is a block diagram schematically illustrating an interleaved global compensation map 578. As discussed herein, the MSPUC block 118 may store the interleaved global compensation map 578 in a single memory buffer to improve storage efficiency. To this end, the MSPUC block 118 may down-sample and interleave the global compensation maps 246 based on foveation data (e.g., location of the central foveation region 150 and/or the outer foveation regions 152) of the display panel 106. For example, the MSPUC block 118 may spatially down-sample each plane of the map by a factor. The factor may be determined based on a type of compensation map (e.g., global compensation map 246, local compensation map 248), the compensation mode, a full size of the display panel (e.g., number of pixels, number of display pixel rows), a sub-sampling factor for each color component, and the like. The global compensation maps 246 may be stored in a single memory buffer used for the packed storage of all components of the five global compensation maps 246. The MSPUC block 118 may interleave the global compensation maps 246 based on foveation data. For example, the global compensation maps 246 may be interleaved such that a first portion may include 1 bpc, a second portion may include 2 bpc, a third portion may include 8 bpc, and so on. In certain instances, the global compensation maps 246 may be interleaved for one channel of the display panel 106. In other instances, the global compensation map 246 may be interleaved for multiple channels. In addition, each of the global compensation maps 246 may be generated based on a respective voltage value.

The interleaved global compensation map 578 may be indexed by Little Endian addressing. For example, a first row 580A of the interleaved global compensation map 578 may correspond to a buffer base address, a second row 580B may correspond to a first address line, a third row 580C may correspond to a second address line, and so on. That is, the line addresses may monotonically increase from a first row 580A to a last row 580N. The global compensation map 246 may include any suitable number of rows 580 that correspond to a portion of the display panel 106. As further discussed in FIG. 21, each row 580 may include a 128-byte stride that stores a width of the global compensation map entries.

Each row 580 may include one or more memory blocks 582 that store voltage values for each component. Within the row 580, an intra-buffer line address may increase from left to right, such as from a first memory block 582A to a second memory block 582B. As illustrated, the row 580 includes five memory blocks 582, however any suitable number of memory blocks 582 may be packed.

Figure 19:
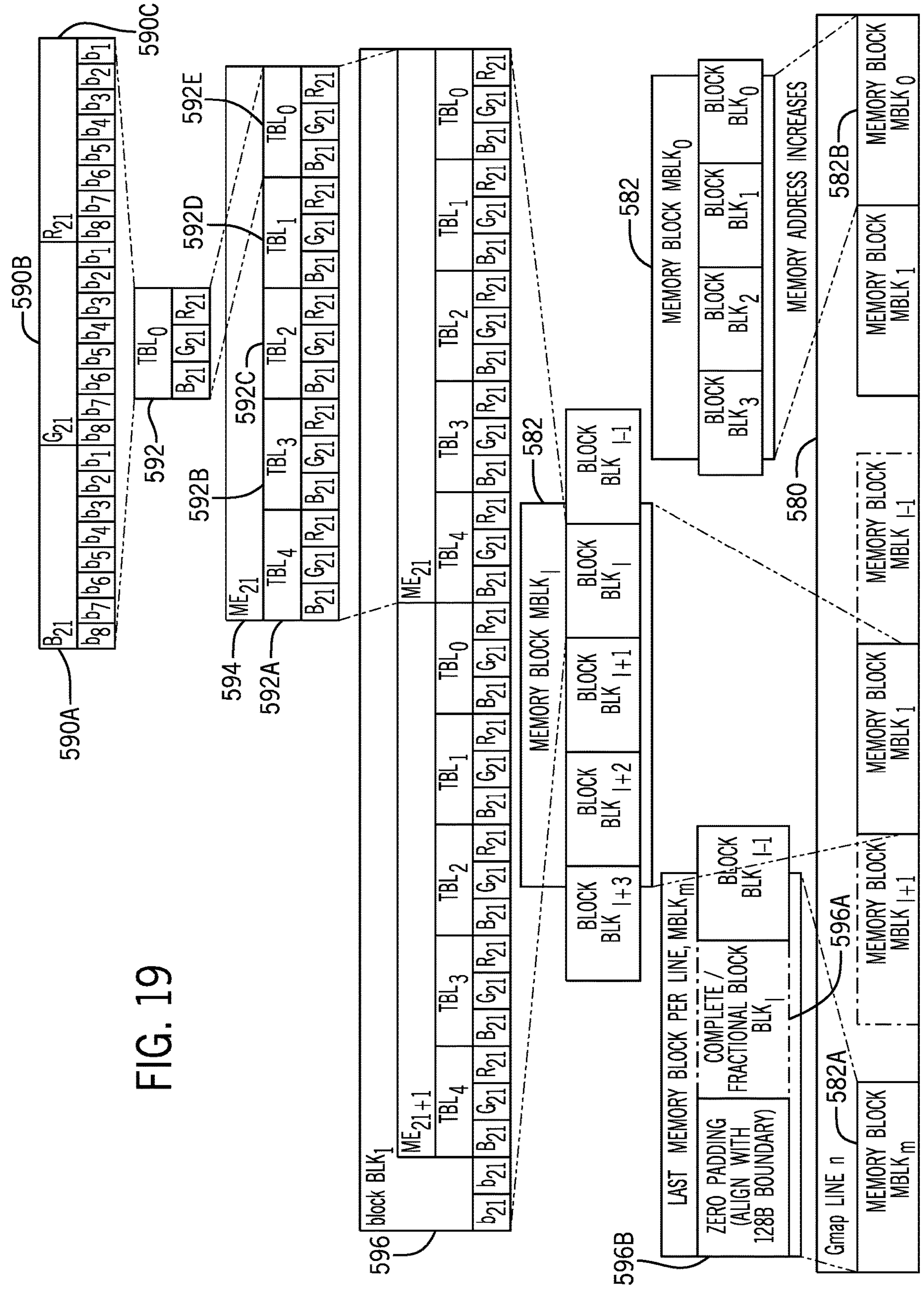
FIG. 19 is a block diagram schematically illustrating a memory buffer layout including a row of the interleaved global compensation map, in accordance with an embodiment.

FIG. 19 is a block diagram schematically illustrating a memory buffer layout including a row 580 of the interleaved global compensation map 578. By way of illustrative example, five global compensation maps 246 may be interleaved to form the interleaved global compensation map 578. It may be appreciated that any suitable number of global compensation maps 246 may be generated and interleaved to form the interleaved global compensation map 578. With the foregoing in mind, the interleaved global compensation map 578 may store 9-bit values for each component 590. As illustrated, the blue component 590A may include 9-bits, the green component 590B may include 9-bits, and the red component 590C may include 9-bits. In other instances, the global compensation may use any suitable bits per component for storage, such as 2-bpc or more, 4-bpc or more, 6-bpc or more, 8-bpc or more, 10-bpc or more, and so on.

The global compensation map 246 may include a global map entry 592 for each display pixel 114 location. Within each global map entry 592, the global compensation map 246 may include a value per component 590. As such, the global map entry 592 may include three entries for the blue component 590A, the green component 590B, and the red component 590C. Since five global compensation maps 246 may be interleaved, a combined global map entry 594 may include a total of fifteen values per pixel location. That is, a first global map entry 592A may include three values for a pixel location, a second global map entry 592B may include three values for the pixel location, a third global map entry 592C may include three values for the pixel location, and so on.

The combined global map entries 594 may be packed on a per row 580 basis. For example, multiple combined global map entries 594 may be packed into a block 596 (e.g., memory block) and multiple blocks 596 may be packed into a memory block 598. As illustrated, the block 596 may include thirty components 590 that use 272-bits (e.g., 34 bytes) of storage. The packing within the blocks 596 may include any suitable number of components using any suitable bits for storage. The blocks 596 may be further packed into memory blocks 598 that use 1024-bits of storage. However, the memory blocks 598 may use any suitable number of bits for storage. Within the memory blocks 598, the blocks 596 may be aligned on a 34 byte boundary. If the number of components at an end of the memory block 598 does not use the entire memory block 596 (e.g., a partial memory block 596A), then a partial memory block 596A may be aligned with a subsequent boundary. As illustrated, the partial memory block 596A may be aligned with a zero padding block 596B. The zero padding block 596B may include values corresponding to the zero emission region (e.g., a first region 514). The partial memory block 596A may be smaller in comparison to the zero padding block 596B. That is, a number of components at an end of the block 596 may not use all of the memory within the block 596 and a portion of the block 596 may include the zero emission data. The blocks 596A and 596B may align with a 128 byte boundary.

The memory blocks 598 may be arranged within a line of the combined global compensation map 246. For example, each memory buffer line may include a 128 byte aligned stride for storing a width of the memory blocks 598 including the global map entries 592. As illustrated, a memory address of the memory buffer line may increase from a first memory block 598A to a last memory block 598B. In this way, the interleaved global compensation map 578 may be packed within a single memory buffer, which may improve operation efficiency and/or storage efficiency.

Figure 20:
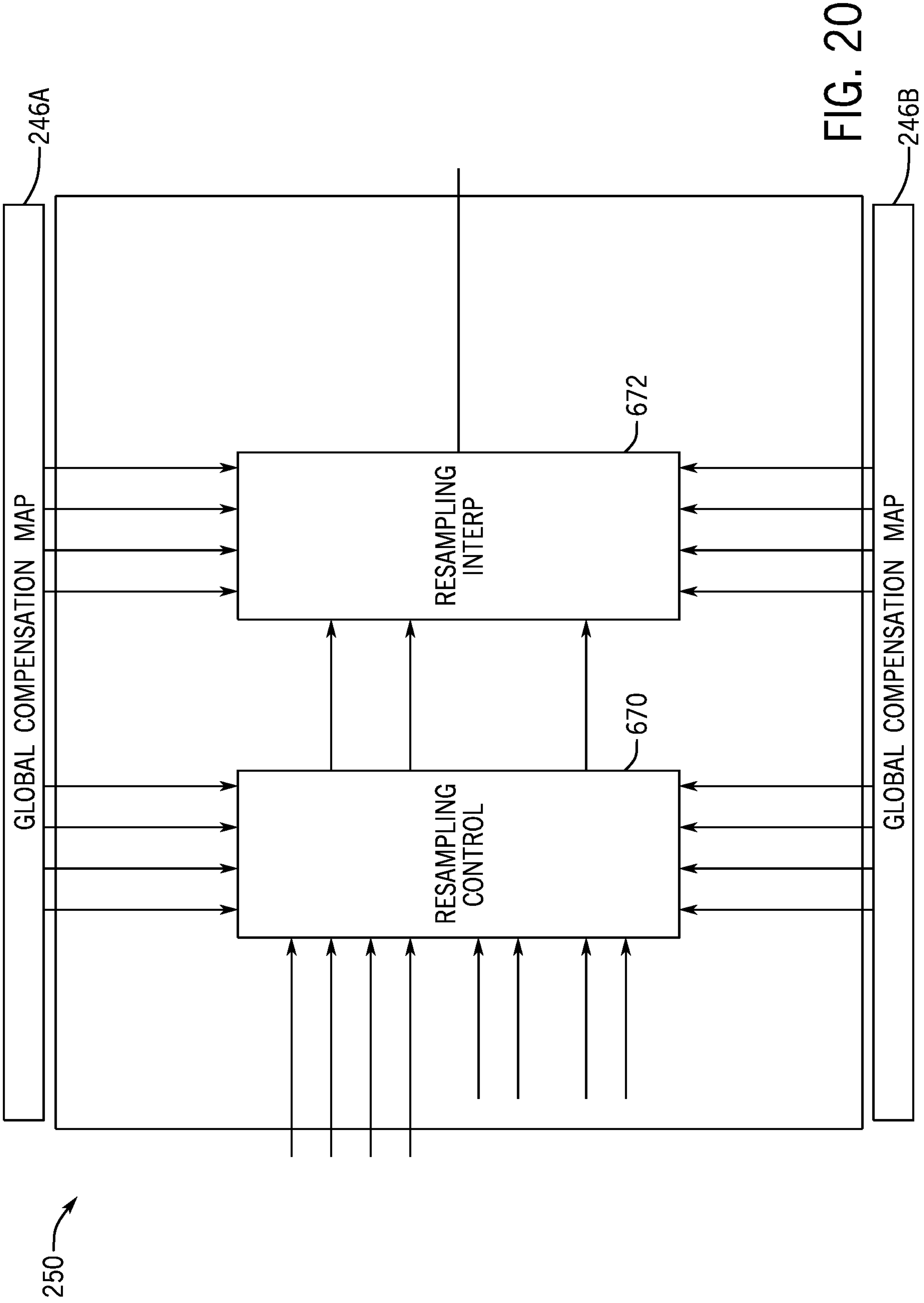
FIG. 20 is a block diagram schematically illustrating a compensation for a display pixel using the global compensation for the electronic display of FIG. 8, in accordance with an embodiment.

FIG. 20 is a block diagram schematically illustrating foveated resampling for the global compensation maps 246. For example, the interleaved global compensation map 578 may be upsampled to determine the global voltage compensation value for a display pixel 114 location. To this end, the MSPUC block 118 may use foveation data to up-sample the interleaved global compensation map 578 based on the group of pixels being processed. For example, the MSPUC block 118 may receive a row and a column corresponding to a portion of the display panel 106. In another example, the MSPUC block 118 may receive a horizontal boundary and a vertical boundary of the portion and the foveation data corresponding to the portion.

At the resampling control block 670, the MSPUC block 118 may up-sample the interleaved global compensation map 578. Prior to upsampling the global compensation maps 246, the MSPUC block 118 may determine alignment of values stored in each of the global compensation maps 246. For example, the global compensation maps 246 may be stored in signed 9-bit formats. The MSPUC block 118 may use aligning, shifting, and the like to upsample the interleaved global compensation map 578. In addition, the MSPUC block 118 may use foveation data of the display panel 106 to upsample each of the global compensation maps 246 to match the portion (e.g., central foveation region 150, outer foveation regions 152) of the display panel 106 being processed.

At the resampling interpolation block 672, the MSPUC block 118 may determine the global voltage compensation value based on the interleaved global compensation map 578. As the global compensation maps 246 may be characterized at different voltage values, the MSPUC block 118 may determine the global voltage compensation value based on one or more global compensation maps 246. In certain instances, the voltage value may correspond to a voltage value of one global compensation map 246. As such, the MSPUC block 118 may determine the global compensation value based on the selected global compensation map 246. In other instances, the voltage value may be between the voltage values of two global compensation maps 246. As illustrated, the MSPUC block 118 may use entries from a first global compensation map 246A and entries from a second global compensation map 246B to determine the global voltage compensation value. The MSPUC block 118 may determine the first global compensation map 246A and the second global compensation map 246 based on the respective characterized voltage value and the source image data 102. The MSPUC block 118 may interpolate between the two global compensation maps 246 to determine the global voltage compensation value. Still in another example, the voltage value may be greater than or less than the five voltage values. As such, the MSPUC block 118 may extrapolate from one or more nearest global compensation map 246, such as the first global compensation map 246A and the second global compensation map 246, to determine the global voltage compensation value.

Figure 21:
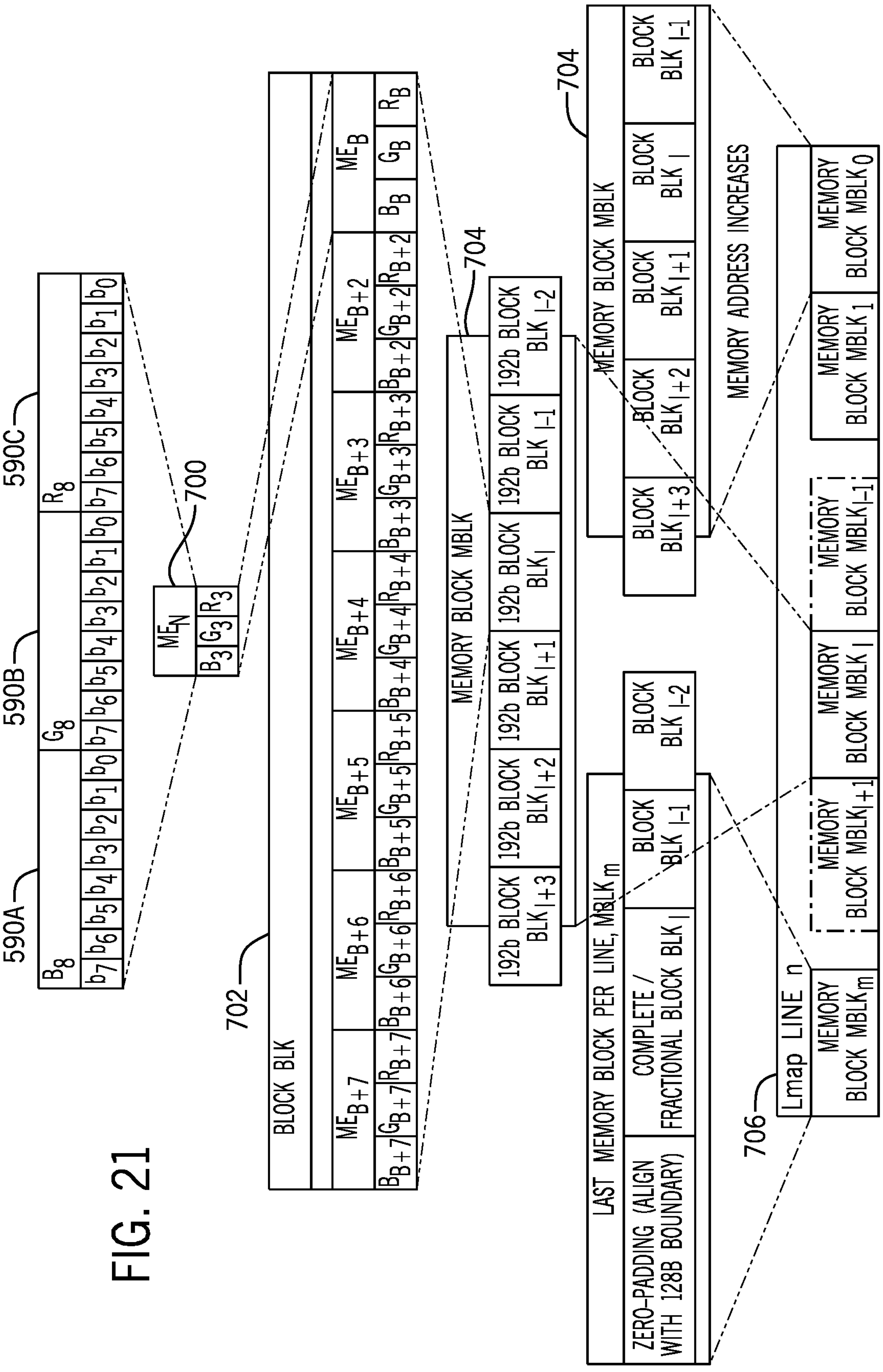
FIG. 21 is a block diagram schematically illustrating compensation for a row of display pixels of a local compensation map for the electronic display of FIG. 8, in accordance with an embodiment.

FIG. 21 is a block diagram schematically illustrating a memory buffer layout including a row of the local compensation map 248. The block diagram of FIG. 24 is substantially similar to the block diagram of the memory buffer layout of FIG. 22 except that each component 590 may be stored as 8 bpc. However, the local compensation map 248 may use any suitable number of bits per component, such as 2 bpc, 9 bpc, 10 bpc, and so on. For example, downsampling, packing, and storing of the local compensation map 248 may be adjusted based on display panel characteristics, such as a type of display panel 106. In addition, the local compensation map 248 may be stored in a single memory buffer, thereby improving storing efficiency.

As illustrated, each component 590 may be stored as 8 bpc. In this way, the compensation applied to the source image data 102 may be up to 8 bpc, which may expand the voltage domain range. The local compensation map 248 may include a local map entry 700 for a display pixel 114 location. The local map entry 700 may be stored within a block 702 (e.g., memory block) that includes multiple local map entries 700. As illustrated, the block 702 stores eight local map entries 700. The block 702 may include 192-bits (24 Bytes) for storing the local map entries 700, however the block 702 may use any suitable number of bits for storing the entries. The blocks 702 may be stored in a memory block 704, which may be organized in a row 706 of the memory buffer.

By way of example, the local compensation map 248 may use 9 bpc for storage. As such, the row 706 may include a 128-byte stride for storing each of the local map entries 700, such that the components 590 may be stored in the block 702 using 216-bits (e.g., 27 Bytes) for storage and aligned on a 27-byte boundary.

Figure 22:
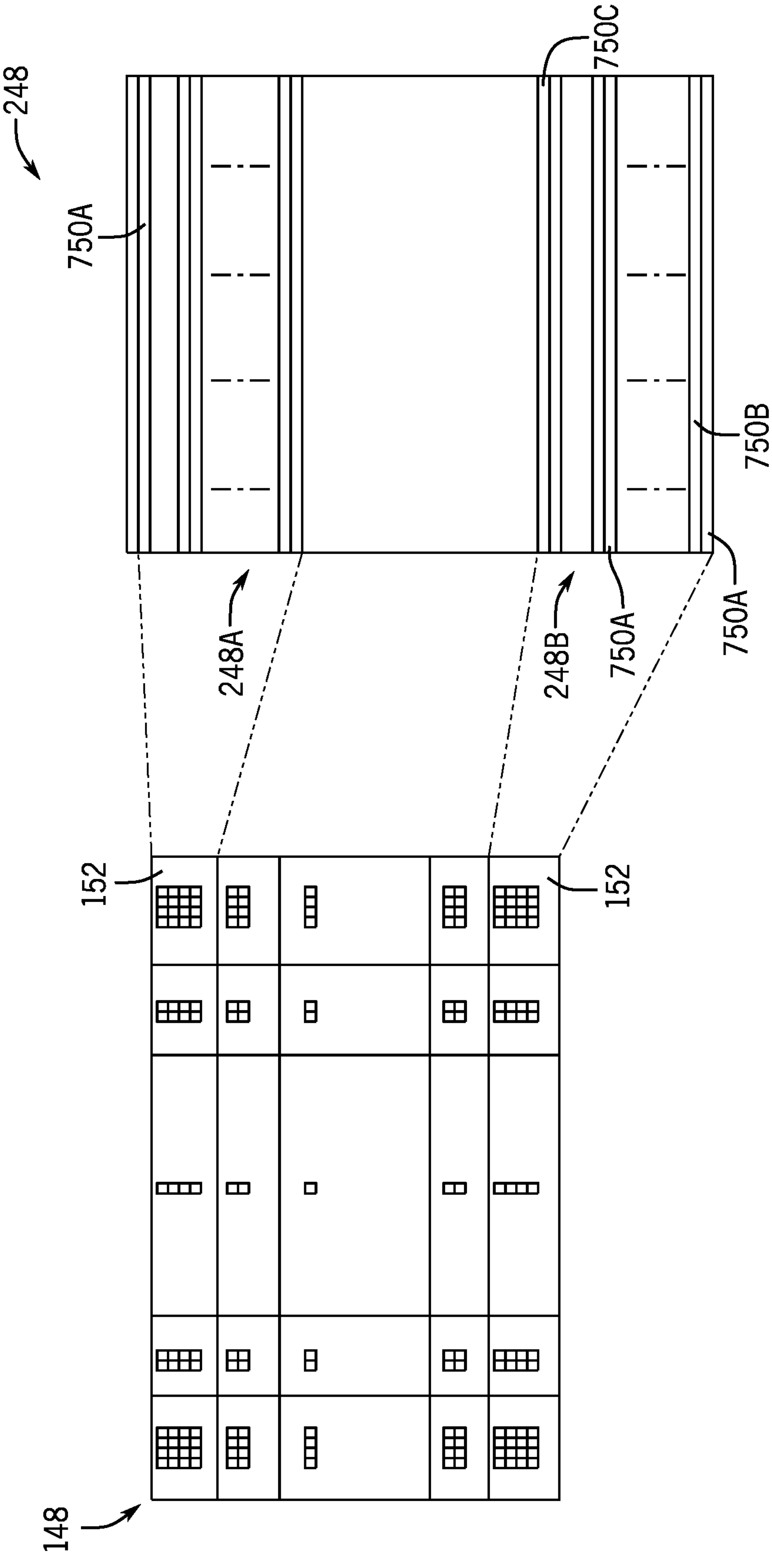
FIG. 22 is a block diagram schematically illustrating up sampling a local compensation map for the electronic display of FIG. 8, in accordance with an embodiment.

FIG. 22 is a block diagram schematically illustrating foveated up-sampling for the local compensation map 248. The MSPUC block 118 may use one local compensation map 248 to determine the local voltage compensation value. For example, the local compensation map 248 may include a voltage offset for each display pixel 114 based on the pixel location.

The local compensation map 248 may be upsampled (e.g., resampled) based on display panel characteristics, such as based on foveation data. The foveation data may include a number of display pixel rows, a number of display pixels, a bit-depth, and/or a resolution of the foveated region. The MSPUC block 118 may use nearest neighbor interpolation, average mode interpolation, or the like to up-sample the local compensation map 248. As discussed here, the foveation regions may be adjusted based on eye data. The MSPUC block 118 may map the local compensation map 248 to current foveation regions of the display panel. The MSPUC block 118 may then resample the local compensation map 248 based on the foveation data, such that the local compensation map 248 corresponds to a foveated resolution for each of the display pixels 114. For example, the foveation data may indicate the central foveation region 150 is positioned in the center of the display panel 106. The MSPUC block 118 may upsample a center portion of the local compensation map 248 by a factor of 1. Additionally or alternatively, the foveation data may indicate an outer foveation region 152 is positioned at a top edge or a bottom edge of the display panel 106. The outer foveation region 152 may uses less pixel resolution than the central foveation region 150. As such, the MSPUC block 118 may upsample a top portion and/or a bottom portion of the local compensation map 248 by a factor of 2 or 4 in a vertical direction, which may save processing power.

The MSPUC block 118 may retrieve the local compensation value based on the local compensation map 248 and a location of the display pixel 114. For example, the MSPUC block 118 may read each index line 750 of the local compensation map 248 to determine the compensation for a respective display pixel 114 in the central foveation region 150. In another example, the MSPUC block 118 may read certain index lines 750 and may skip reading other index lines 750 to improve memory bandwidth, such as within the outer foveation regions 152. In another example, the MSPUC block 118 may read every other index line based on the local compensation map 248 being upsampled by a factor of 2 and when the MSPUC block 118 may be interpolating vertically in a vertical grouped region with a 4×4 display pixel grouping.

In another example, the MSPUC block 118 may read additional index lines 750C to provide for interpolation in the vertical direction. For example, at a boundary between two foveation regions, the MSPUC block 118 may retrieve voltage offset values for both sets of index lines 750A and 750B. For example, retrieving additional voltage offset values may support interpolation in a vertical direction and/or a vertical region. As such, the MSPUC block 118 may determine a local compensation value for the source image data 102.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

a display panel comprising a plurality of display pixels;

an image source configured to provide image data; and image processing circuitry configured to:

receive a brightness level of the display panel;

receive the image data configured to be displayed by the plurality of display pixels, wherein the image data comprises gray level data for a first display pixel of the plurality of display pixels;

convert the gray level data to voltage data based on the brightness level;

determine a compensation for the voltage data based on a global voltage compensation value and a local voltage compensation value, wherein the global voltage compensation value is configured to compensate for non-uniformities occurring at a first spatial frequency and the local voltage compensation value is configured to compensate for non-uniformities occurring at a second spatial frequency, and wherein the second spatial frequency is greater than the first spatial frequency;

apply the compensation to the voltage data to generate compensated voltage data; and convert the compensated voltage data into compensated gray level data for the first display pixel, wherein converting the compensated voltage data comprises compressing a voltage domain range of the compensated voltage data.

2. The electronic device of claim 1, wherein the image processing circuitry is configured to determine the compensation by:

retrieving a plurality of global compensation maps; and determining the global voltage compensation value by interpolating or extrapolating between a first global compensation map of the plurality of global compensation maps and a second global compensation map of the plurality of global compensation maps.

3. The electronic device of claim 2, wherein the image processing circuitry is configured to determine the compensation by:

determining a gain value based on the voltage data;

applying the gain value to a local compensation map; and determining the local voltage compensation value based on the local compensation map and a portion of the display panel.

4. The electronic device of claim 3, wherein the local compensation map comprises a higher resolution than the first global compensation map or the second global compensation map.

5. The electronic device of claim 1, wherein the image processing circuitry is configured to convert the gray level data to the voltage data by:

determining a gray-to-voltage lookup table based on the brightness level, wherein the gray-to-voltage lookup table comprises a zero emission region, a first region, a second region, and a third region, and wherein each region comprises uniform spacing between entries.

6. The electronic device of claim 5, wherein the image processing circuitry is configured to:

determine that the gray level data is within the first region, the second region, or the third region; and interpolate within the first region, the second region, or the third region to generate the voltage data.

7. The electronic device of claim 1, wherein the image processing circuitry is configured to receive the brightness level by:

receiving a temperature value of the display panel; or receiving a current-to-voltage curve of the first display pixel from sensing circuitry.

8. The electronic device of claim 7, wherein the image processing circuitry is configured to:

retrieve calibration data in response to receiving the temperature value, wherein the calibration data comprises one or more pre-characterized current-to-voltage curves at a respective anchor temperature;

fit the calibration data to a brightness-to-current curve using one or more segments;

convert the brightness-to-current curve to generate an additional current-to-voltage curve; and update a gray level-to-voltage lookup table and a voltage-to-gray level lookup table based on the additional current-to-voltage curve.

9. The electronic device of claim 7, wherein the image processing circuitry is configured to:

update a gray level-to-voltage lookup table and a voltage-to-gray level lookup table based on the received current-to-voltage curve.

10. The electronic device of claim 7, wherein the image processing circuitry is configured to update a lookup table for converting the voltage data to the gray level data based on the current-to-voltage curve of the first display pixel.

11. The electronic device of claim 1, wherein compressing the voltage domain range of the compensated voltage data comprises:

interpolating within a threshold voltage range to determine the compensated gray level data; or extrapolating from the threshold voltage range to determine the compensated gray level data.

12. Processing circuitry, comprising:

first conversion circuitry configured to convert source image data corresponding to a display pixel of a plurality of display pixels of an electronic display from gray level data of the source image data to voltage data;

non-uniformity correction circuitry configured to generate compensated voltage data based on the voltage data, a global compensation map, and a local compensation map, wherein the global compensation map is configured to compensate for non-uniformities occurring at a first spatial frequency and the local compensation map is configured to compensate for non-uniformities occurring at a second spatial frequency, and wherein the second spatial frequency is greater than the first spatial frequency; and second conversion circuitry configured to convert the compensated voltage data to digital code corresponding to the display pixel by:

receiving an indication of operating characteristics of a display panel;

compressing a voltage domain range of the compensated voltage data based on the operating characteristics of the display panel; and converting the compensated voltage data to the digital code.

13. The processing circuitry of claim 12, wherein the first conversion circuitry is configured to convert the source image data by:

receiving a temperature or current-to-voltage data from sensing circuitry;

updating a brightness-to-voltage relationship based on the temperature or the current-to-voltage data; and determining the voltage data based on the brightness-to-voltage relationship.

14. The processing circuitry of claim 12, wherein the non-uniformity correction circuitry is configured to generate the compensated voltage data by:

determining a global voltage compensation based on the global compensation map in a first compensation mode;

determining a local voltage compensation based on the local compensation map in a second compensation mode; and determining a compensation based on the global compensation map and the local compensation map in a third compensation mode, wherein the global compensation map is a lower resolution than the local compensation map.

15. The processing circuitry of claim 12, wherein the second conversion circuitry is configured to compress the voltage domain range by:

determining a threshold voltage range based on the operating characteristics.

16. A method comprising:

receiving, via processing circuitry, gray level data and operating characteristics of a display panel;

converting, via the processing circuitry, the gray level data to voltage data;

determining, via the processing circuitry, a compensation based on a global voltage compensation value and a local voltage compensation value, wherein the global voltage compensation value is configured to compensate for non-uniformities occurring at a first spatial frequency and the local voltage compensation value is configured to compensate for non-uniformities occurring at a second spatial frequency, and wherein the second spatial frequency is greater than the first spatial frequency;

generating, via the processing circuitry, compensated image data by applying the compensation to the gray level data; and converting, via the processing circuitry, the compensated image data to compensated gray level data by compressing a voltage domain range of the compensated image data based on the operating characteristics of the display panel.

17. The method of claim 16, wherein the operating characteristics of the display panel comprise a temperature value of the display panel, a current-to-voltage relationship of the display panel, a bit-depth of the display panel, and foveation data of the display panel.

18. The method of claim 16, wherein compressing the voltage domain range comprises:

interpolating between voltage values within a threshold voltage range to convert the compensated image data to the compensated gray level data, wherein the threshold voltage range is determined based on the operating characteristics; or extrapolating from the threshold voltage range to convert the compensated image data to the compensated gray level data.

19. The method of claim 16, wherein determining, via the processing circuitry, the compensation comprises:

determining the compensation based a global compensation map based on a first compensation mode;

determining the compensation based on a local compensation map based on a second compensation mode; or determining the compensation based on both the global compensation map and the local compensation map based on a third compensation mode.

20. The method of claim 19, wherein determining the compensation based on the local compensation map comprises:

up-sampling the local compensation map based on the operating characteristics;

reading a first line of the local compensation map based on the operating characteristics; and skipping a second line of the local compensation map based on the operating characteristics.

* * * * *